United States Patent [19]
McCool

[11] Patent Number: 4,849,970
[45] Date of Patent: Jul. 18, 1989

[54] SMOOTHING APPARATUS FOR AN INDEPENDENTLY CLOCKED NETWORK

[75] Inventor: John F. McCool, Cupertino, Calif.

[73] Assignee: Advanced Micro Devices, Inc., Sunnyvale, Calif.

[21] Appl. No.: 195,963

[22] Filed: May 19, 1988

[51] Int. Cl.$^4$ .............................................. H04J 3/06
[52] U.S. Cl. ..................................... 370/100; 370/108
[58] Field of Search ..................... 370/100, 103, 110.1, 370/108; 375/106, 107, 112

[56] References Cited

U.S. PATENT DOCUMENTS

| | | | |
|---|---|---|---|
| 4,154,984 | 5/1979 | Murasor | 370/108 |
| 4,402,079 | 8/1983 | Fellinger et al. | 370/108 |
| 4,594,728 | 6/1986 | Niquel et al. | 370/108 |

Primary Examiner—Robert L. Griffin
Assistant Examiner—Frank M. Scutch, III
Attorney, Agent, or Firm—Fliesler, Dubb, Meyer & Lovejoy

[57] ABSTRACT

A method and appartaus are disclosed for preserving a minimum or maximum interpacket gap length in an independently clocked data network, typically one following the ANSI-FDDI standard. A smoother is placed downstream of each elastic buffer in the network. The smoother detects the occurrence in an arriving stream of bytes of short preambles, i.e., those having fewer than a threshold number of idle bytes, and inserts some number $n_a$ additional idle bytes into such preambles. Subsequently arriving bytes are delayed by $n_a$ byte clock periods by, in a preferred embodiment, storing them in a FIFO sequence of registers. In order to be available for lengthening other short preambles when they arrive, the smoother also detects the arrival of long preambles, i.e., those having more than the threshold number of idle bytes, and deletes a number $n_d$ idle bytes from such long preambles. Deletion is accomplished in the preferred embodiment by reducing the delay of the stream, which in turn is accomplished by reducing the length of the FIFO sequence of delay registers by $n_d$ registers. Idle bytes which may have been temporarily stored in delay registers which are no longer part of the FIFO sequence are discarded. This reduces the extension of the smoother and makes it available for inserting idle bytes into subsequently arriving short preambles. The method and apparatus can be expanded to provide several extended states at each of several different thresholds. It can also be applied in a network requiring a maximum interpacket gap length by providing a normal state and one or more contracted states.

36 Claims, 9 Drawing Sheets

STATE N: SEL_N
STATE E: SEL_E

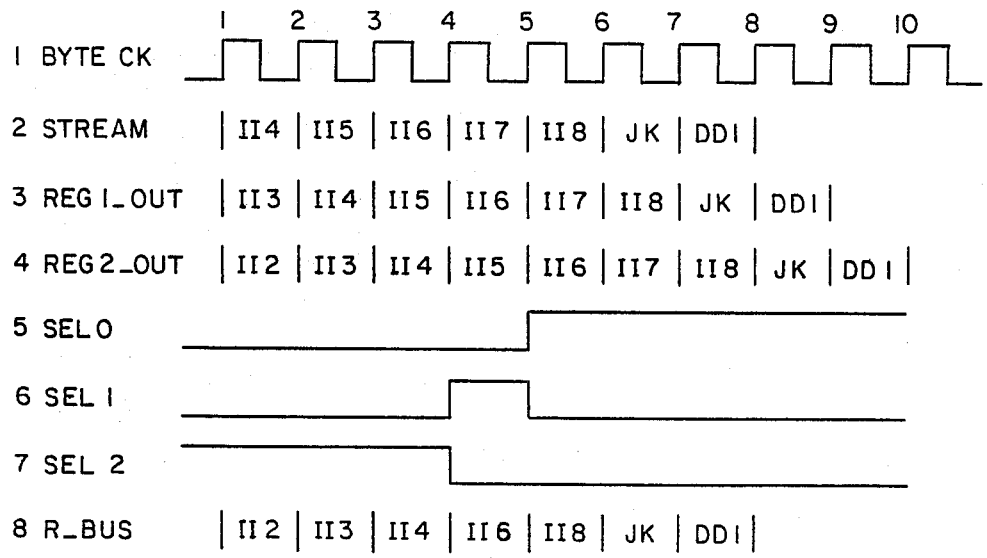
FIG.—10
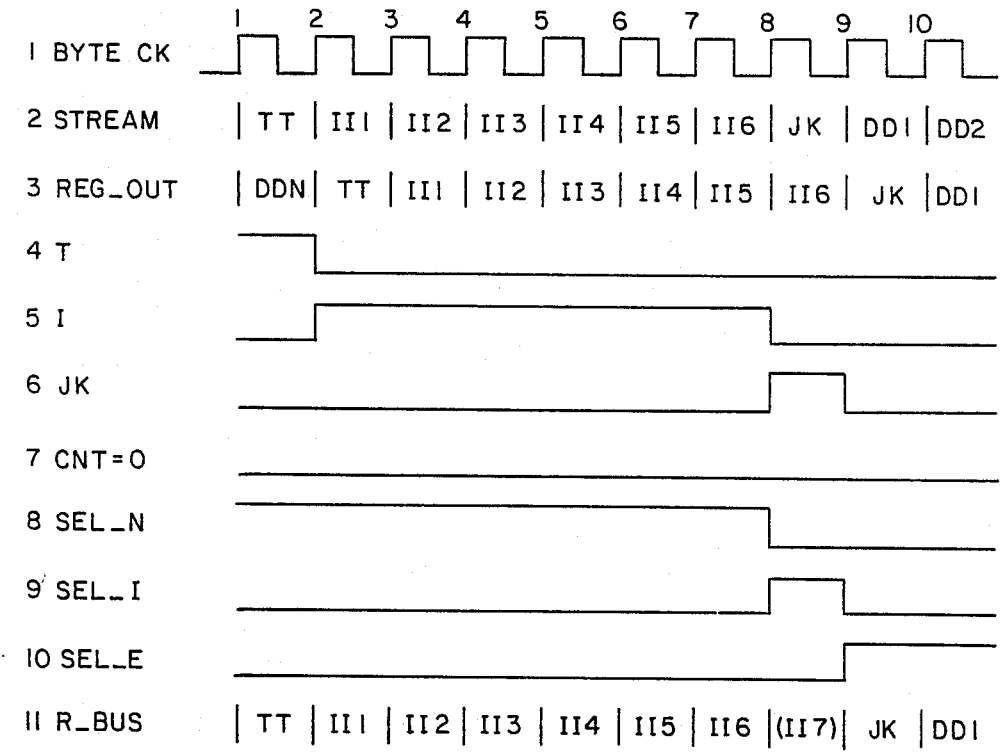
FIG.—4a

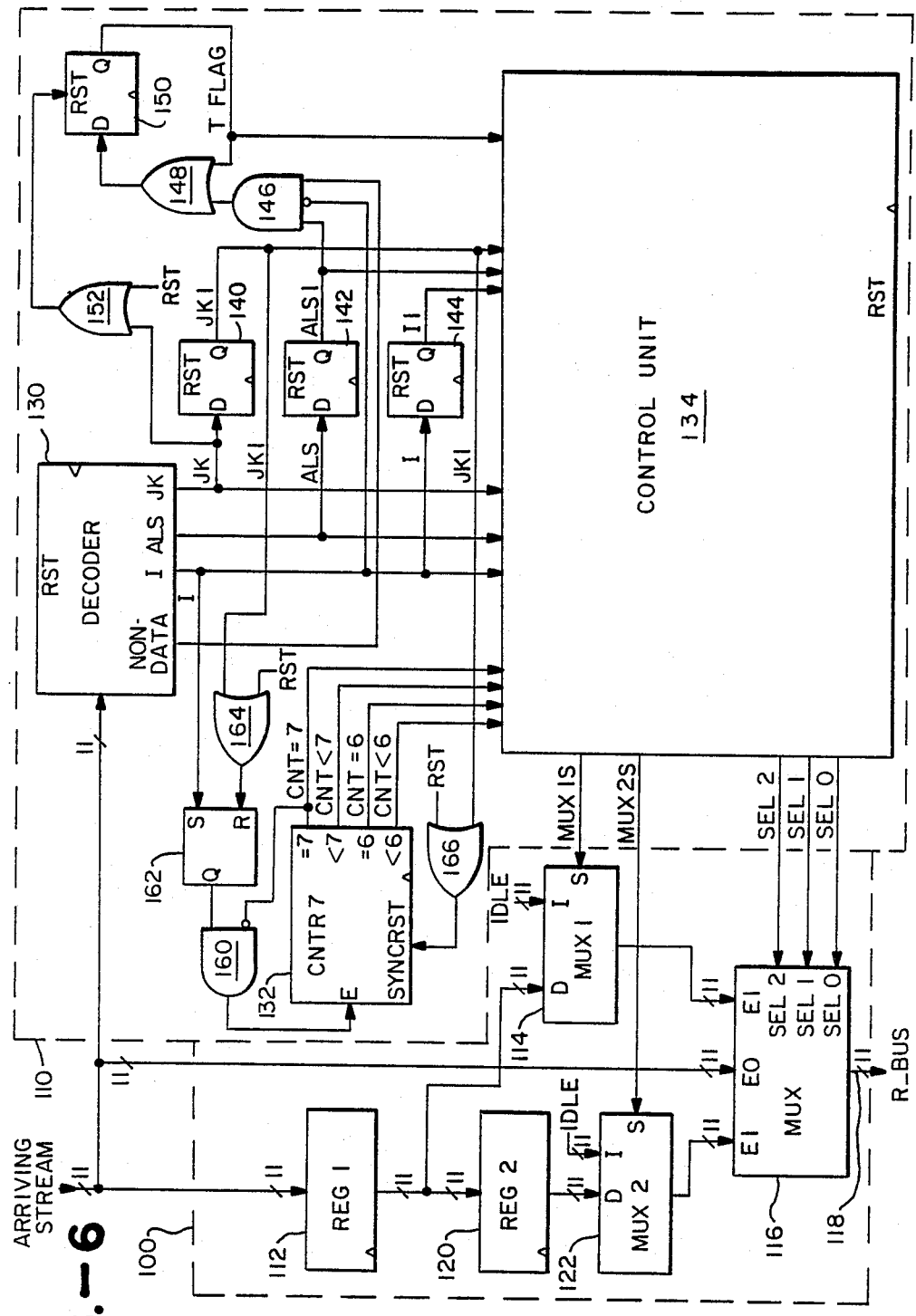
FIG.—6

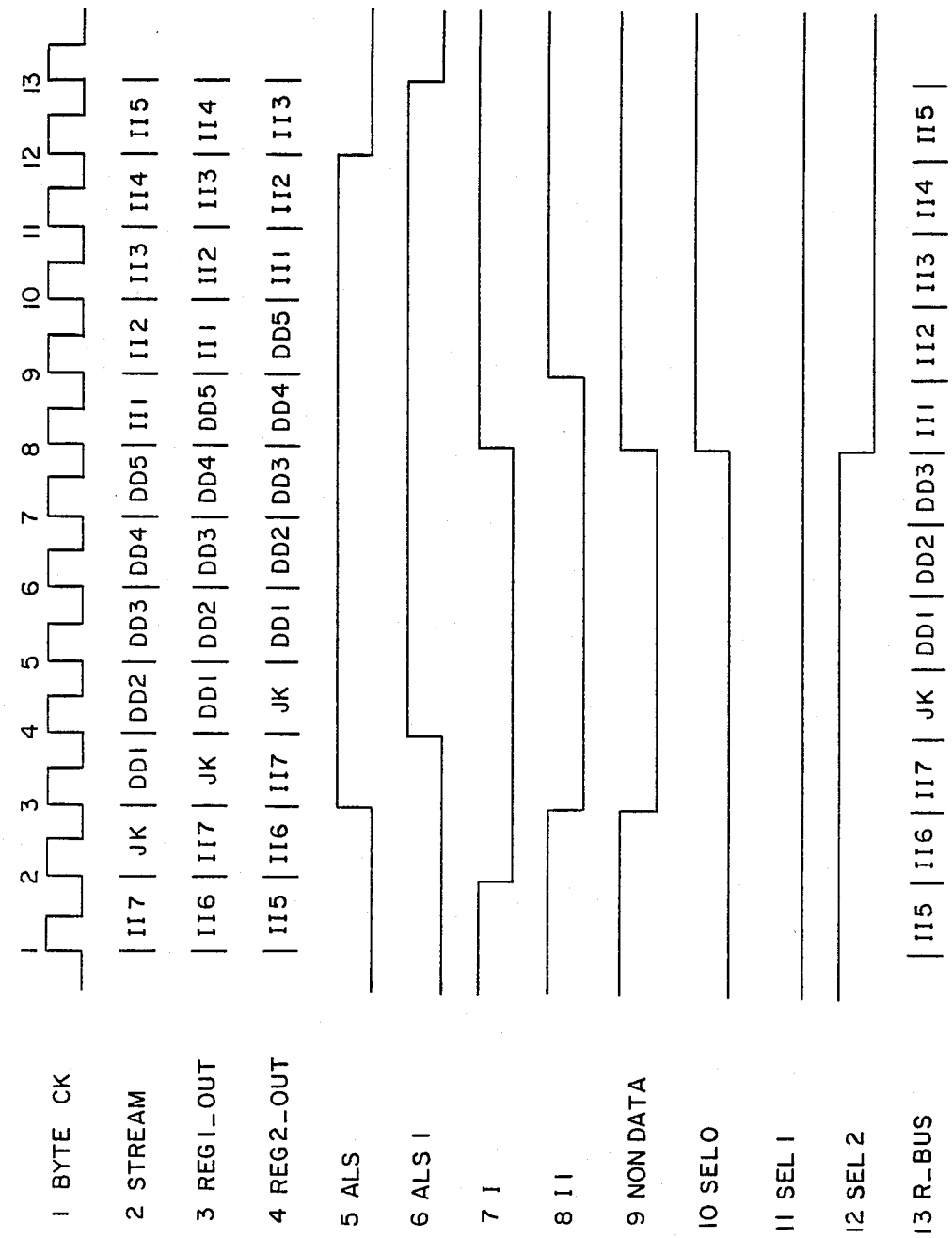

SMOOTHING APPARATUS FOR AN INDEPENDENTLY CLOCKED NETWORK

CROSS REFERENCE TO RELATED CO-PENDING APPLICATION

A related, co-pending application of particular interest to the instant application is entitled "Receiver Synchronization in Encoder-Decoder", U.S. Ser. No. 07/072,955 filed July 15, 1987 on behalf of K. Annamalai. The related application is assigned to the assignee of the present application.

This application is also related to an application entitled, "Implementation of Smoothing Apparatus For An Independently Clocked Network", U.S. Ser. No. 07/195,964 filed concurrently herewith on behalf of K. Annamalai. The latter application is also assigned to the assignee of the present application.

FIELD OF THE INVENTION

The invention relates to independently clocked digital networks, and more particularly, to apparatus for avoiding a deletion of too many bits, bytes or nibbles from an inter-packet gap due to differences in the clock frequencies of different stations.

BACKGROUND OF THE INVENTION

Digital local area networks are categorized into those which have a synchronous clocking scheme and those which have an asynchronous clocking scheme. In a network with a synchronous clocking scheme, one station is designated a master and generates its own clock, and all other stations derive their clock from the incoming signal, regenerated using, for example, a phase lock loop (PLL). In a network with an asynchronous clocking scheme, also referred to as an independently clocked network, each station generates its own clock signal for its own internal use. The internal clock signal is also the signal used for transmitting data to the next station downstream and is therefore sometimes referred to as the transmit clock Tx. Under an ANSI standard X3T9.5, each individually generated clock signal is specified to have a frequency which differs by no more than ±50 ppm from a predetermined nominal frequency. Independently clocked networks are preferred where PLL jitter is a problem, such as in high-speed fiber-distributed data networks. The present invention relates to independently clocked networks.

Typically, in a token ring network, data is passed around the ring in the form of packets or frames. Packets, and the temporal gaps between them, are divided into a plurality of 10-bit bytes, each consisting of two 5-bit symbol codes. Since the invention applies at the bit, nibble (symbol) or byte level of granularity, the term "informational unit" is used herein to refer to any of these three levels. From the discussion hereinafter it will be seen that only slight modifications are needed to implement the invention at intermediate levels of granularity, or at multiple-symbol or multiple-byte levels of granularity, so the term "informational unit" will be understood to apply to any desired level of granularity.

Symbols may be data symbols (high order bit is 0) or control symbols (high order bit is 1). Each packet begins with a starting delimiter, consisting of a "J" control symbol followed by a "K" control symbol, and terminates with an ending delimiter, consisting of a "T" control symbol. Under some circumstances, a packet may terminate with an "H" control symbol. If a packet ends with a data symbol instead of a control symbol, it is considered a "stripped frame" and may be deleted from the network. The interpretation and coding scheme for the various symbols are defined in the ANSI standard. This and other aspects of the ANSI standard are described in the related Receiver Synchronization application, and also in U.S. Pat. Nos. 4,692,894 ("Overflow-/Underflow Detection for Elastic Buffer") and 4,703,486 ("Communication Data Encoder/Decoder Component System Architecture"). Both of these patents issued to Bemis and are assigned to the assignee of the present application. The related Receiver Synchronization application and both Bemis patents are incorporated by reference in their entirety herein.

It should be noted that the terms "packet" and "frame", as used herein, are intended to include stripped frames, even though the ANSI standard often uses the terms in a manner which excludes stripped frames.

Data packets are typically separated from one another in the data stream by a period of time known as an interpacket gap (IPG), or a preamble. Interpacket gaps are usually filled with idle ("I") symbols, which, according to the standard, consist of five "1" bits each. Aside from helping to maintain the communication status, this choice of code for the idle symbol is preferred since if a 1-bit portion, or a full 5-bit symbol, or even a 10-bit byte of idle symbols is deleted or inserted into the data stream unintentionally, the resulting stream still consists of idle symbols.

According to the standard, no station may transmit a data packet until it has already transmitted at least eight bytes of idle (16 idle symbols). Eight idle bytes is therefore the minimum length for an interpacket gap transmitted from the station which originates it. This gap may shorten during transmission and re-transmission around the ring for reasons explained below, but the standard ensures with a high probability that each station receiving information will see interpacket gaps of no fewer than six bytes each. Symbols other than the idle symbol may appear in an inter-packet gap either due to noise or to such occurrences as realignment of start delimiters on byte or symbol boundaries. All bytes which are within packets (including stripped frames) are sometimes referred to herein as active bytes and all bytes between packets are sometimes referred to herein as inactive bytes.

A problem with independently clocked networks recognized early on is that since the Tx clock of any given node may have a frequency as much as 100 ppm faster or slower than the frequency at which data is being received by that node, it is entirely possible that the receiving station will unintentionally detect a different number of incoming bytes or other informational units than the number originally transmitted. That is, if the receiving station has a slower Tx clock than that of the transmitting station, the receiving station will periodically miss one byte of incoming information; similarly, if the receiving station has a Tx clock which is faster than that of the transmitting station, the receiving station will periodically clock in a single received byte twice. Because of the choice of codes for the idle symbol as explained above, unintentional deletion or addition of idle bits, symbols or bytes is not a severe problem. Severe data integrity problems would result, however, if a bit, symbol or byte was deleted from or inserted into a data packet.

To prevent these occurrences, manufacturers implement a dual-port elastic buffer (EB), which is a FIFO having an input port clocked by a receive clock ("Rx"), derived from the incoming signal, and an output port which is clocked by the station's own internally generated Tx clock. Elastic buffers are described in detail in the related Receiver Synchronization application and in the two Bemis patents.

Upon initialization, incoming informational units are initially stored in the EB until the EB reaches a nominal or centered depth, and then the station in which the EB is located begins reading out the bytes sequentially according to its Tx clock. Thus, if a station's Tx clock is slightly faster than the Tx clock of the immediately upstream neighboring station, the EB will gradually reduce in depth from the nominal position as the receiving station reads bytes of incoming information faster than they are being placed in the EB. Similarly, the contents of an EB in a station having a Tx clock which is slower than the Rx clock will grow from the nominal depth gradually to a greater depth as the incoming information is placed in the EB more quickly than the station reads it.

Then, at an opportune time, such as just after the end of a data packet or just before the beginning of the next data packet, the EB is automatically recentered to the nominal depth. If bytes of information must be added in order to accomplish this, they are added as idle units in the inter-frame gap. If bytes of information must be deleted in order to accomplish this, they are deleted from the inter-frame gap. Even if the EB is designed to permit the addition and deletion of informational units with only a 1-bit granularity, neither of these situations cause data integrity problems because of the choice of codes for the idle symbol. Moreover, the maximum frame size is defined so that given the tolerance of ±50 ppm in Tx clock frequencies, the re-centering operation would add or delete no more than one byte of idle at a time.

Previously, since the minimum inter-packet gap length for an originator is specified at eight bytes of idle, and the minimum inter-packet gap length for a receiving station is specified at only six bytes of idle, it was thought that sufficient tolerance had been built in such that it was statistically unlikely for the inter-packet gap length to unintentionally fall below the minimum guaranteed receive length of six bytes of idle. Supporting this view was the assumption that in every network having a random distribution of clock frequencies within the specified tolerance, there would be approximately the same number of net byte adders as there are of net byte deleters. However, statistical studies show that in large networks, though the average inter-packet gap length remains at about eight bytes of idle, the size of any particular interpacket gap stands a significant chance of falling below the guaranteed minimum of six bytes.

In one proposed algorithmic solution to this problem, known as the "square shoulder" algorithm, a counter is added to the EB for counting the number of idle bytes in each IPG. When an idle byte is to be deleted, instead of deleting it automatically from the next IPG, the apparatus waits until an inter-packet gap arrives which is longer than some threshold number, for example seven bytes. One of the idles in that IPG is then deleted. The available depth of the EB is also increased to accommodate additional bytes building up while waiting for a long enough inter-packet gap. When a byte is to be added, as in previous systems, it is simply added in the next IPG to arrive.

Another proposed algorithm, known as the "smooth-shoulder" algorithm, is similar to the square-shoulder algorithm in that the apparatus postpones deletion of idle bytes until a long enough inter-packet gap arrives. It is different, though, in that more than one byte can be deleted from such an IPG if the IPG is longer than a second threshold value. Different numbers of bytes can be deleted depending on the length of the arriving IPG. Again, adding stations add bytes indiscriminately in the next arriving IPG.

A disadvantage of both of these schemes is that only net deleter stations participate in alleviating the problem. Whether a station is a net adder or net deleter depends on the relationship of its Tx clock frequency to that of its immediately upstream neighbor, not to the network nominal or average clock frequency. Thus, only half the stations in an average network are net deleters, and in any particular network, only a few may be net deleters. In the worst case, only a very small percentage of the stations on the network may participate in alleviating the problem.

SUMMARY OF THE INVENTION

It is therefore an objeot of the present invention to provide apparatus for compensating for differences between Tx clocks of various stations in an independently clocked network.

It is another objeot of the present invention to provide apparatus by which both net adders and net deleters of idle bytes participate in the compensation for Tx clock frequency differenoes.

The above objects and others are accomplished according to the invention by providing a smoother at various positions around the network, preferably but not necessarily downstream of the elastic buffer in each station. The smoother detects the occurrence in an arriving stream of bytes of short preambles, i.e., those having fewer than a threshold number $I_{th1}$ of idle bytes, and inserts some number $n_{1a}$ additional idle bytes into such preambles. $I_{th1}$ should desirably be smaller than the minimum worst case average number of preamble bytes, as explained below. Subsequently arriving idle bytes are delayed by $n_{1a}$ byte clock periods by, in a preferred embodiment, storing them in a FIFO sequence of registers. The smoother continues to lengthen short preambles in this way until the number of byte clock periods by which the smoother delays the stream equals the number of delay registers available. At this time the smoother is said to be in its maximum extended state.

In order to be available for lengthening other short preambles when they arrive, the smoother also detects the arrival of long preambles, i.e., those having more than $I_{th1}$ idle bytes, and deletes some number $n_{1d}$ idle bytes from such long preambles. Deletion is accomplished in the preferred embodiment by reducing the delay of the stream, which in turn is accomplished by reducing the length of the FIFO sequence of delay registers by $n_{1d}$ registers. Idle bytes which may have been temporarily stored in delay registers which are no longer part of the FIFO sequence are discarded. This reduces the extension of the smoother and makes it available for inserting idle bytes into subsequently arriving short preambles.

In one aspect of the invention, additional normal and extended states are provided at a different threshold $I_{th2}$, in addition to those provided at the threshold $I_{th1}$. For example, where the minimum originating station gap length is 8, $I_{th1}$ may be 7 and $I_{th2}$ may be 6. Thus, the $I_{th1}$ normal and extended states operate to maintain the interpacket gap length at 7 or more bytes of idle, and only in the emergency situation where a preamble shorter than 6 bytes arrives when the $I_{th1}$ portion of the smoother is fully extended, the $I_{th2}$ portion is available to lengthen the preamble to at least 6 bytes of idle.

In some types of networks it is desirable to maintain a maximum IPG length instead of a minimum IPG length. Apparatus similar to the above may be used to accomplish this, simply by choosing threshold values which are larger than the maximum worst case average number of preamble bytes. In this situation the apparatus may be initialized into the most extended state instead of the least extended state, the most extended state then being referred to as the normal state $C_0$ and all the less extended states being referred to as contracted states $C_1$ . . . $C_{CMAX}$. Similarly, by cascading together one smoother having a threshold below the minimum worst case average number of preamble bytes and one smoother having a threshold above the maximum worst case average number of preamble bytes, a system according to the invention can effectively tend the preamble length toward a central length, minimizing the number of preambles which are either longer or shorter than that threshold length.

BRIEF DESCRIPTION OF THE DRAWINGS

The invention will be described with respect to particular embodiments thereof. Other objects, features and advantages of the invention will become apparent upon reference to the specification and the drawings, in which:

FIGS. 4a and 4b are timing diagrams useful for illustrating the operation of the circuit of FIG. 2;

FIG. 6 is a block diagram of another smoother according to the invention;

FIGS. 8–11 are timing diagrams useful for illustrating the operation of the smoother of FIGS. 6 and 7.

DETAILED DESCRIPTION

Figure 1:
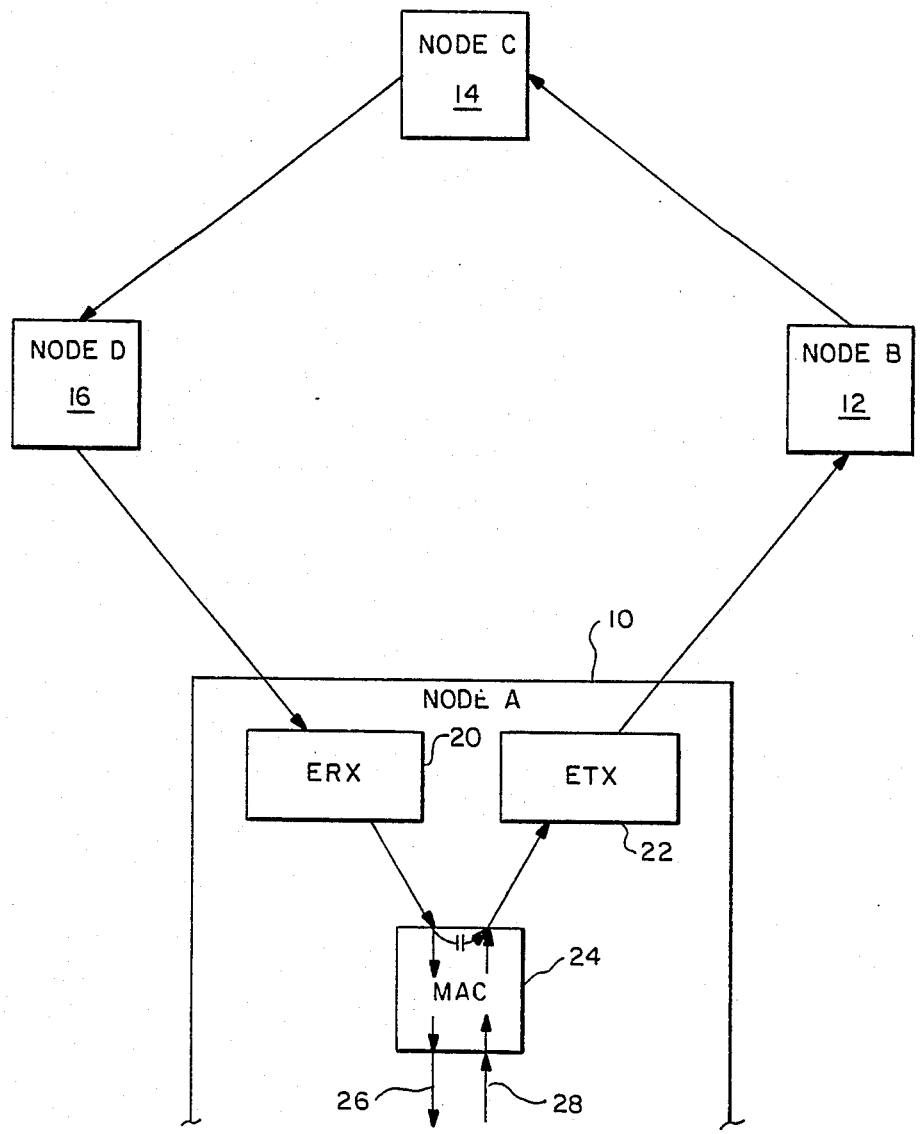
FIG. 1 is a block diagram of portions of a token ring network in which the invention may be implemented.

FIG. 1 shows a typical token ring network having four nodes or stations A, B, C and D, designated respectively as 10, 12, 14 and 16. Though the invention will be described with respect to a token ring network, it will be understood that the invention applies in any ring network, indeed in any network incorporating a string of nodes, in which information is transmitted in packets. Each of the nodes 10, 12, 14 and 16 receives data via a physical medium from its immediately clockwise neighbor. It then processes the data, re-transmits it identically or in a modified form, or transmits its own data, to the next counterclockwise node in sequence. The physical medium may be, for example, an optical fiber. Though not shown in FIG. 1, ring networks typically have another data path traversing the ring in a clockwise manner as well.

As shown With reference to node A, each of the nodes 10, 12, 14 and 16 typically include an Encoder/Decoder Receiver (ERX) 20, an Encoder/Decoder Transmitter (ETX) 22 and a media access controller (MAC) 24. The ERX 20 and the ETX 22 together generally perform the functions specified in the "physical layer" of ANSI specification X3T9.5, also referred to as the Fiber Distributed Data Interface (FDDI) specification. The ERX 20 receives the information from the incoming fiber, decodes it and processes it in a manner hereinaftr described, and sends it to MAC 24. MAC 24 performs the tasks specified in the MAC layer of the FDDI specification. For example, it may simply repeat the information on its output, or it may transmit the incoming information via a data path 26 to higher layers in the system. MAC 24 also can receive information on a bus 28 for presentation at the output of MAC 24. The output of MAC 24 is connected to the ETX 22, which performs the FDDI specified physical layer tasks associated with transmitting information along the fiber-optic network to the next node in sequence.

The ERX 20 includes the elastic buffer referred to earlier, a phase lock loop for deriving the received clock Rx from the incoming signal, a transmit clock Tx generator and various shift registers, decoders and sync registers, all as described in detail in the two Bemis patents and in the related Receiver Synchronization application. It is important to note only that the smoother according to the present invention preferably, for reasons explained below, operates somewhere downstream of the elasticity buffer EB and upstream of the MAC 24.

Figure 2:
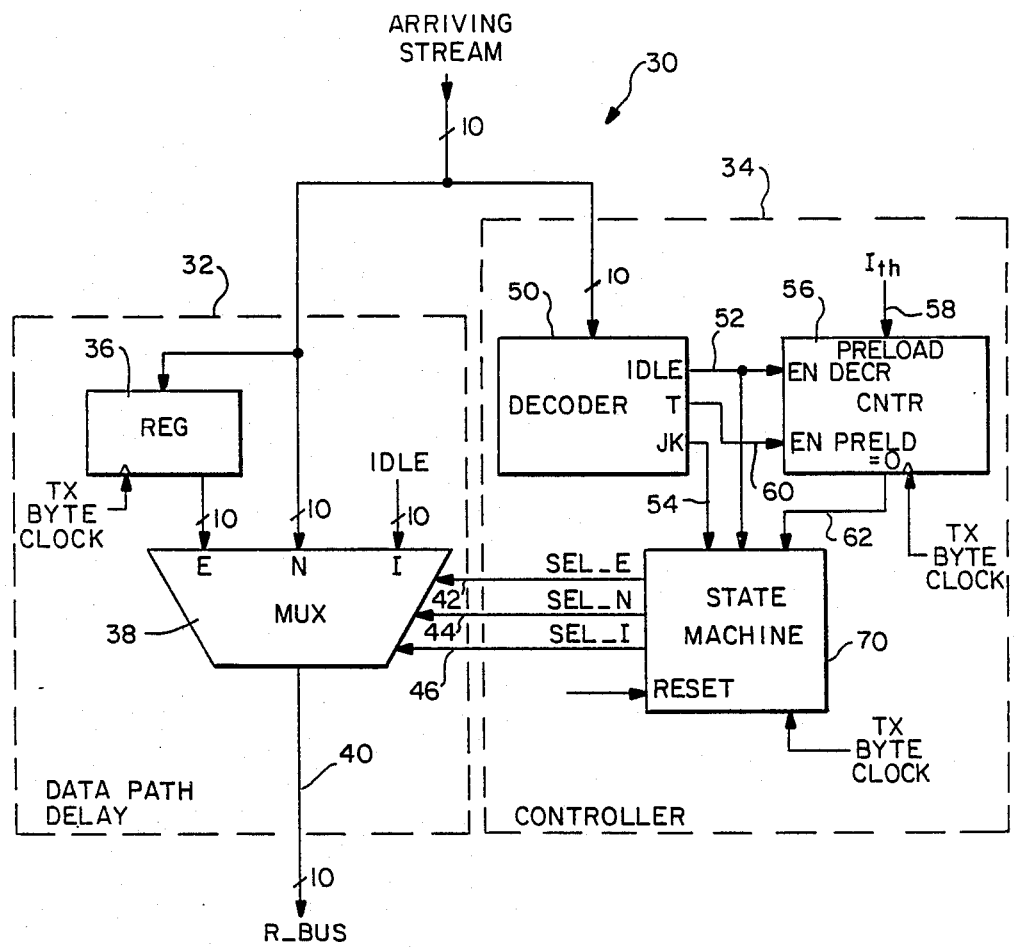
FIG. 2 is a block diagram of a smoother according to the invention.

FIG. 2 shows a block diagram of a smoother 30 according to the invention. Though the smoother is intended primarily for use following an elasticity buffer in a fiber distributed data network, it will be understood that it may be used to smooth inter-packet gaps in any arriving stream of information, even outside the context of a data network. It will also be understood that though the block diagram of FIG. 2 illustrates the use of the invention on full 10-bit byte wide informational units at a time, the invention may also be used with nibble-wide (also referred to as symbol-wide) informational units, bit-wide informational units, or informational units of intermediate widths.

The smoother 30 comprises two basic functional blocks: a data path delay 32 and a controller 4. Of course, particular embodiments may combine the two blocks into one or divide them into more than two. The data path delay unit 32 comprises a register 36 adapted to receive the arriving stream of information, one byte at a time, and provide it on the next clock cycle to an E input of a multiplexer 38. The clock used to clock the register 36 is a Tx byte clock, which is a divided-down version of the Tx clock generated in the ERX 20. As noted, it does not matter that this independently generated Tx clock does not exactly match the frequency of the incoming data from the previous node, since any difference is handled by the elasticity buffer (not shown).

The multiplexer 38 also has an N input coupled to receive the arriving stream of data directly, and an I input hard-wired to receive a byte of the pre-defined idle symbols. The output 40 of the multiplexer 38 is the output of the smoother and feeds a bus referred to as the R_BUS. The multiplexer 38 also has three select inputs 42, 44 and 46 for selecting onto the output 40 the byte present on, respectively, the E input, the N input, and the I input of the multiplexer 38.

The controller 34 comprises a decoder 50 which also receives the arriving bytes of information and generates a signal on a line 52 indicating whether the incoming byte is an idle byte, and a signal on a line 54 indicating whether the incoming byte is a JK start delimiter. Though the decoder 50 is shown in FIG. 2 as being part of the controller 34, it will be understood that it can equally well be placed outside the controller 34. The line 52 is connect to an enable decrement (EnDecr) input of a down counter 56. The down counter 56 has a preload input 58 for preloading a value into the counter in response to a signal on an enable preload (EnPreld) input 60. The counter 56 is designed to stop its counting when it reaches zero, and to output a signal on an output line 62 indicating whether the counter is at zero. Like the register 36 in the data path delay unit 32, the down counter 56 is clocked by the Tx byte clock.

The controller 34 also includes a state machine 70. The state machine 70 receives as inputs both the JK signal on line 54 and the CNT=0 signal on line 62, as well as the idle signal on line 52. It generates as outputs a SEL_E signal connected to the select input 42 of the multiplexer 38, a SEL_N input connected to the select input 44 of the multiplexer 38 and a SEL_I signal connected to the select input 46 of the multiplexer 38. The state machine 70 is clocked by the Tx Byte clock, and further includes a reset input hereinafter described.

Figure 3:
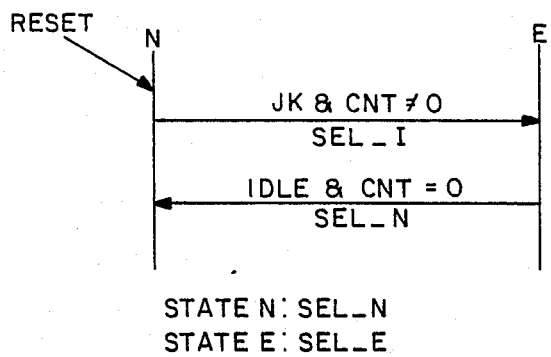
FIG. 3 is a state diagram showing the function performed by the state machine shown in FIG. 2.

FIG. 3 shows a state diagram describing the operation of state machine 70. It consists of two states, a normal (N) state and an extended (E) state. The state machine is initialized or reset into the N state, where it activates the SEL_N output. If a JK byte is received before CNT reaches 0, the state machine deactivates SEL_N and activates SEL_I, and correspondingly moves to state E. In state E, SEL_E is activated. If CNT reaches 0 while in state E and an idle byte is still being received, the state machine deactivates the SEL_E output and activates the SEL_N output, and correspondingly moves back to state N.

FIG. 4a is a timing diagram illustrating the operation of the smoother 30 for inserting an idle byte when a string of fewer than $I_{th1}=7$ idle bytes arrives. The Tx byte clock signal which operates the apparatus is shown as the top waveform in FIG. 4a. For the purposes of this illustration it is assumed to be a square wave, and it is further assumed that all synchronous components in the smoother trigger on the rising edge of the byte clock square wave. Of course, other types of clock signals and trigger times will suffice. For convenience of discussion, each of the rising edges of the byte clock signal as shown in FIG. 4a is numbered.

The second line of FIG. 4a shows the arriving stream of bytes which are input to the register 36 in the data path delay portion of the smoother 30 and to the deooder 50 in the control portion of the smoother 30. The vertical bars in this line represent the approximate time relative to the Tx byte clock signal at which the information in the arriving stream changes to the next byte.

When the period of time represented by the waveforms of FIG. 4a begins, the final byte of a preceding data packet, namely a byte having a T symbol in its upper nibble, is present in the arriving stream. The T in the upper nibble may be followed in different types of packets by a variable length state indicator, but for the purpose of this illustration it is assumed that it is followed only by a second T symbol. The last data byte of the packet, designated DDN, has already been clocked into the register 36, as shown in the third line of FIG. 4a. The smoother is initially in the normal state, so SEL_N is high and SEL_I and SEL_E are both low. Since SEL_N is the only active select signal being applied to multiplexer 38, the R_BUS output 40 of the multiplexer 38 receives the data present at the N input of multiplexer 38. Thus the TT byte present in the arriving stream is routed directly to the R_BUS as shown in the last line of FIG. 4a. Also, since the arriving byte includes a T symbol, the decoder 50 in the control portion 34 outputs an active signal on the T output and inactive signals on the I and JK outputs, as shown in the fourth, fifth and sixth lines of FIG. 4a.

On the second rising edge of the byte clock, since the T signal was active, the counter 56 is preloaded with the threshold value of seven. The counter output CNT=0 is thereafter inactive. Following the second rising edge, the incoming byte in the arriving stream is an idle byte, designated I11. Thus the T output of decoder 50 goes low and the I output goes high. The JK output remains low.

Since the I signal is now high, and remains high through the string of idles received in the arriving stream, the EnDecr input of counter 56 is active for the rising edge following each of the arriving idle bytes. Thus, the counter 56 decrements once for each of the following rising edges: 3, 4, 5, 6, 7 and 8. Incoming idle bytes are also loaded into the register 36 on each of these rising edges, the last idle byte in the string, I16, being loaded into the register 36 on the eighth rising edge. After the eighth rising edge of the byte clook, CNT=1.

After the eighth rising edge, a JK arrives in the arriving stream. The decoder 50 therefore brings I low (holding the count at CNT=1), and raises JK. Referring to the state diagram of FIG. 3, it can be seen that the conditions for moving from state N to state E are now present. That is, JK is active and CNT=0 is inactive. Thus, SEL_N is immediately brought low and SEL_I is brought high for the period between rising edges 8 and 9 of the byte clock. Accordingly, since SEL_I is the only select input to multiplexer 38 which is active between the eighth and ninth rising edges of the byte clock, the multiplexer 38 selects the hard-wired idle byte onto the R_BUS during this period. The JK byte, which would otherwise be routed to the R_BUS during this time, is not lost since on the ninth rising edge of the byte clock it is clocked into the register 36.

The arriving byte in the stream immediately following the ninth rising edge of the byte clock is the first data byte DD1 in the packet which began with the immediately preceding JK. Thus the JK output of decoder 50 goes low following the ninth rising edge, and the T and I outputs remain low. The state machine 70 switched to the extended state E on the ninth rising edge of the byte clock, so SEL_I goes low after the ninth rising edge and SEL_E goes high. Since SEL_E is the only select input of multiplexer 38 which is active following rising edge 9, the JK which was previously stored in register 36 is routed via the E input to the R_BUS. All subsequent bytes from the arriving stream continue to be routed through the register 36, which acts effectively as a 1 byte clock period delay, to the R_BUS. As oan be seen by referring to the last line of FIG. 4a, the smoother 30 has effectively inserted an II7 byte following the II6 byte and preceding the JK byte from the arriving stream.

The smoother is now in its extended state E, and already using the delay register 36. It therefore cannot insert an idle byte into any more preambles until the smoother is permitted to contract to its normal state and register 36 becomes available again. The timing diagram of FIG. 4b shows how this is accomplished.

Figure 4B:
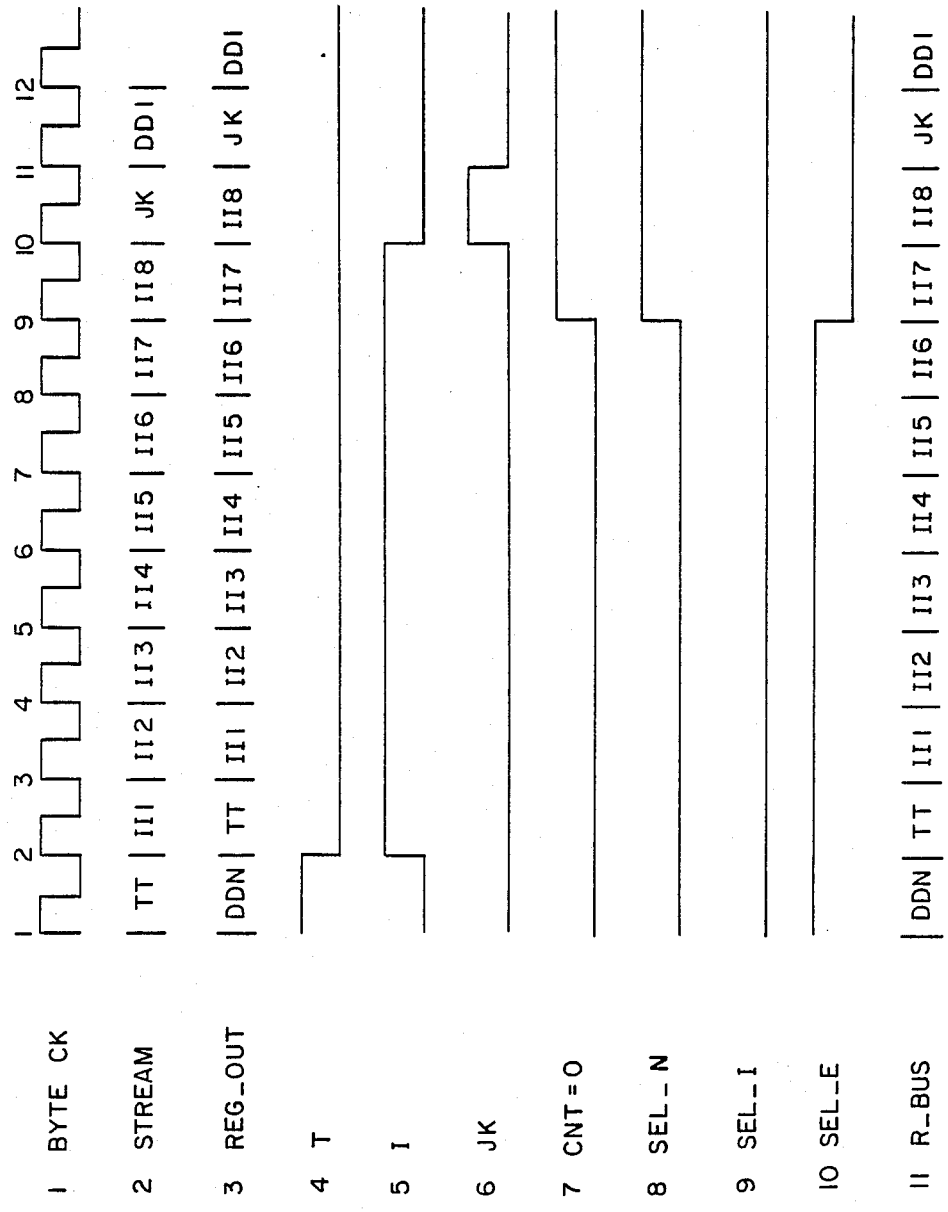

When the period represented by the timing diagram of FIG. 4b begins, the arriving byte is a TT, signifying the end of the previous data packet. The last data byte in the packet, DDN, is already loaded into the register 36. Since the smoother is in the extended state E, SEL_E is the only select input of multiplexer 38 which is active. The multiplexer 38 therefore selects the DDN in the register 36 onto its output 40 as shown in the last line of FIG. 4b.

Since the first arriving byte shown in FIG. 4b is a TT, the T output of decoder 50 is active following the first rising edge of the byte clock and the I and JK outputs are inactive. Since T is active, counter 56 is preloaded with the threshold value of 7 on the second rising edge. The byte in the arriving stream following the second rising edge of the byte clock is an idle, so T goes low and I goes high. Since the next 8 bytes in the arriving stream are all idle bytes, I remains high until after the tenth rising edge of the byte clock, thereby enabling the counter 56 to decrement on the rising edge following each of the idle bytes. Thus the counter decrements on each of the rising edges 3, 4, 5, 6, 7, 8 and 9. It does not decrement on the tenth rising edge, since as previously mentioned, the counter 56 is designed to stop decrementing when it reaches zero. Each of these idle bytes is passed to the R_BUS, as shown in the last line of FIG. 4b, following a delay of one TX byte clock period inserted by the presenoe of register 36.

CNT does reach zero after the ninth rising edge, so the CNT=0 line becomes active at that time. The next arriving byte is still an idle (II8), indicating that the arriving preamble is long enough to delete a byte. As shown in the state diagram of FIG. 3, all of the conditions are present following the ninth rising edge for moving the smoother from the extended state E to the normal state N. That is, CNT=0 is active and the incoming byte is still an idle. Thus, following the ninth rising edge, SEL_E falls low and SEL_N goes high. SEL_I remains low. Since SEL_N is now the only select input to multiplexer 38 which is active, the multiplexer 38 selects the byte from the arriving stream, namely II8, to the R_BUS directly. The II7 stream byte, which was clocked into the register 36 on the ninth rising edge, never does reach the R_BUS and is effectively deleted from the preamble.

On the tenth rising edge, the state machine 70 moves to the normal state N and continues to activate only the SEL_N select input for multiplexer 38. The multiplexer 38 thereafter selects all bytes directly from the arriving stream onto the R_BUS. As shown in the last line of FIG. 4b, one byte of idle effectively has been deleted from the preamble as provided to the R BUS. It does not matter that the byte deleted was II7, and not the last byte in the preamble, since all idle bytes are interchangeable. Since the smoother is now in its normal state N, it is once again available for inserting an idle byte into the next short preamble that arrives.

The smoother according to the invention is not foolproof. It will be appreciated that once the smoother is in its extended state, it no longer has capacity to insert a byte of idle into an arriving short preamble. These preambles will pass directly through the smoother (actually through the delay register), and remain as short preambles to downstream elements in the system. If a given node is a net deleter, and happens to delete a byte from a preamble which is already only 6 bytes long, and if the smoother in that node is already in its extended state, then a 5-byte preamble will be passed to the MAC 24 in violation of the minimum guaranteed by the FDDI standard.

Figure 5:
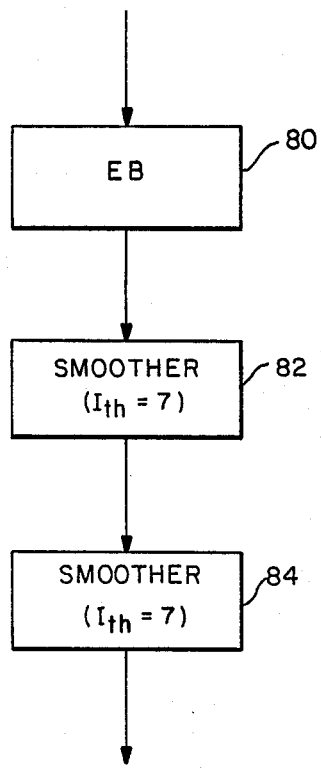
FIGS. 5, 13 and 14 are block diagrams showing how smoothers may be cascaded according to the invention.

The statistical probability of this occurrence can be minimized by cascading a second smoother operating serially with the first smoother in each node. This is shown in FIG. 5, in which an elasticity buffer 80 is followed downstream by a smoother 82, which is itself followed downstream by a smoother 84. In effect, a second smoother operating serially with a first smoother makes a second extended state available for lengthening short preambles. In the situation just described, where a 5-byte preamble arrives when the first smoother is already in the extended state, the second smoother, which is statistically far less likely to be in the extended state, can extend and insert a sixth idle byte.

The cascaded smoothers shown in FIG. 5 are both indicated as having the same threshold of $I_{th}=7$. Any numbers of smoothers may be cascaded at this threshold. It is preferable, however, to have at least one smoother with a threshold of $I_{th}=6$, since in effect the extended state of that smoother would be reserved for the emergency situation of a 5-byte preamble arriving when the $I_{th}=7$ smoother is already extended. This will be understood by considering a network in which each node has an $I_{th}=7$ smoother and an $I_{th}=6$ smoother. If a 6-byte preamble arrives when the $I_{th}=7$ smoother is already extended, the $I_{th}=6$ smoother will not correct it. A 6-byte preamble is undesirable, since it risks subsequent shortening to the illegal 5-byte preamble by a subsequent node, but there is at least a strong statistical probability that a downstream node will be able to extend and insert a seventh idle byte before this happens. On the other hand, if a 5-byte preamble arrives while the $I_{th}=7$ smoother is already extended, the $I_{th}=6$ smoother is available to extend and insert a sixth idle byte. By letting the 6-byte preamble go by, the $I_{th}=6$ smoother effectively preserves itself for the emergency situation of a 5-byte preamble. In fact, if the $I_{th}=6$ smoother is extended, when the next 7-byte preamble arrives the $I_{th}=6$ smoother will cut it down to 6 bytes in order to return itself to the normal state and be ready for another emergency situation. In computerized simulations, the cascading of an $I_{th}=7$ smoother with an $I_{th}=6$ smoother has been found to be extraordinarily effective in preventing 5-byte IPGs.

It will also be appreciated that two or more smoothers cascaded and having one extended state each may be combined into a single smoother having more than one extended state. Smoothers may also incorporate other functions, such as deleting bytes from the end of stripped frames. Such a function gradually eliminates stripped frames from the network, a desirable feature, and at the same time desirably provides an opportunity for reducing the extension of the smoother. The technique of eating backwards into stripped frames is not an aspect of the invention, but rather is made possible by the invention.

As previously mentioned, smoothers according to the invention need not be used in the context of a token ring network. They are useful wherever an arriving stream of bytes having certain characteristics needs to be kept above (or below, as described hereinafter) some threshold length. In a token ring data network, smoothers are preferably placed within each node, immediately downstream of the elastic buffer, since the elastic buffer is the element which would potentially delete idle bytes. By placing the smoother immediately downstream of the elastic buffer, all subsequent downstream components have a greatly reduced probability of receiving an illegally short preamble. However, smoothers may certainly be placed in other positions in each node, such as immediately upstream of the ETX 22, and/or anywhere else in the ring.

Figure 7:
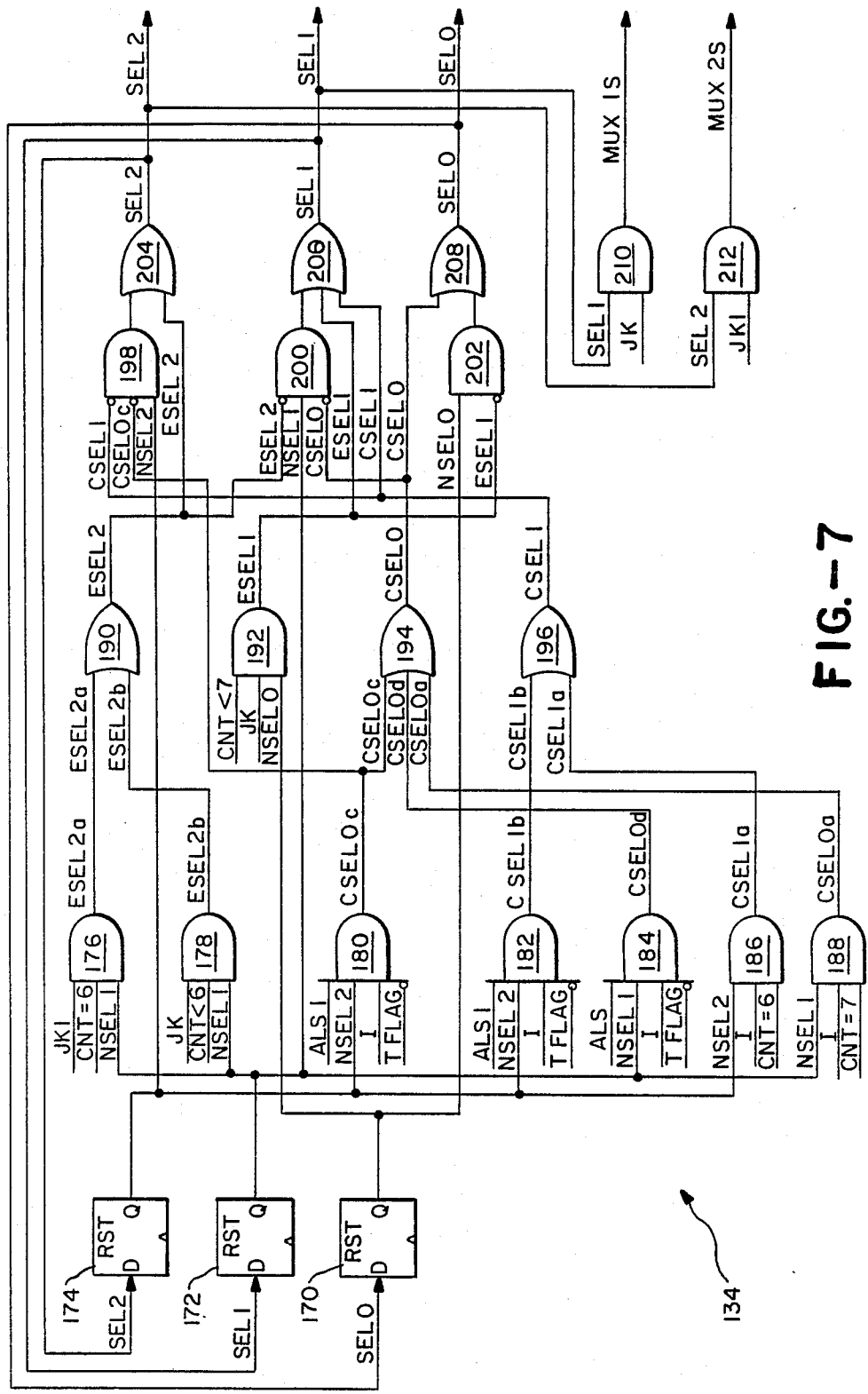
FIG. 7 is a schematic diagram of the control unit shown in FIG. 6.

FIGS. 6 and 7 show a variation of the basic smoother of FIG. 2. Like the smoother of FIG. 2, the smoother of FIGS. 6 and 7 includes a data path delay portion 100 (see FIG. 6) and a control portion 110. In the data path delay portion 100, the arriving stream is connected to the input of a first delay register 112, the output of which is connected to the input of a second delay register 120, the output of which is connected to the D input of a multiplexer 122. The output of the first delay register 112 is also connected to the D input of another multiplexer 114. Each of the multiplexers 122 and 114 has a second input, designated I, which is hard-wired to an idle byte. The outputs of the multiplexers 114 and 122 are connected, respectively, to a E1 input of a multiplexer 116 and a E2 input of the multiplexer 116. The multiplexer 116 also has a E0 input which is connected directly to the arriving stream. The output 118 of the multiplexer 116 is connected to an R_BUS for use downstream in the system. The data path shown here is 11 bits wide, representing one 10-bit byte plus parity. It can be seen that the E0 input of the multiplexer 116 receives the bytes of the arriving stream directly; the E1 input receives either an idle byte or the bytes of the arriving stream as delayed by one Tx byte clock period; and the E2 input of the multiplexer 116 receives either an idle byte or the bytes of the arriving stream as delayed by two Tx byte clock periods.

The control portion 110 of the smoother includes as major functional blocks a decoder 130, a three-bit counter 132 and a control unit 134. The decoder 130 has an input which is connected to receive the same arriving stream of bytes which is provided to the data path delay portion 100. The decoder 130 includes a number of circuits not shown specifically. Purely combinatorial circuitry activates a JK output when the incoming byte is a JK byte, activates an I output when the incoming byte contains an idle symbol in the upper nibble, and activates a NONDATA output when the incoming byte is a control byte (e.g., I, JK, T, V. etc.) as opposed to a data byte. The decoder 130 also generates on an ALS output a signal indicative of whether the apparatus is in an Active Line State. ALS is defined to go active on the byte following a JK byte, and to go inactive after the second idle byte following the end of a data packet.

The JK, ALS and I signals all form inputs to respective D flip-flops 140, 142 and 144. These flip-flops delay the respective signals by one clock cycle, thereby generating respective delayed signals JK1, ALS and I1.

The ALSI output of flip-flop 142 is connected to a non-inverting input of an AND gate 146, another non-inverting input of which is connected to the NONDATA output of decoder 130. An inverting input of AND gate 146 is connected to receive the I output of decoder 130. The output of AND gate 146 is connected to one input of an OR gate 148, the output of which is connected to the D input of a D flip-flop 150. The Q output of the D flip-flop 150 represents a TFLAG signal, which is connected to the second input of OR gate 148. The TFLAG signal is used for stripped frame handling, as described below. The D flip-flop 150 also has an RST input which is connected to the output of an OR gate 152, one input of which is connected to the JK output of decoder 130. The other input of OR gate 152 is connected to receive a reset signal.

The counter 132 is an incrementing counter having an enable (En) input, and synchronous reset input and four outputs which are active, respectively, when CNT=7, CNT<7, CNT=6 and CNT<6. The En input of the counter 132 is connected to the output of an AND gate 160, an inverting input of which is connected to the CNT=7 output of the counter 132. A non-inverting input of AND gate 160 is connected to the Q output of a set/reset flip-flop 162, the set (S) input of which is connected to the I output of deooder 130. The reset (R) input of the set/reset flip-flop 162 is connected to the output of an OR gate 164. The two inputs to the OR gate 164 are connected, respectively, to the JK1 output of flip-flop 140 and to the reset signal. The synchronous reset input of counter 132 is connected to the output of another OR gate 166, the two inputs of which are connected, respectively, to the JK1 output of flip-flop 140 and to the reset signal.

The registers 112 and 120, the decoder 130, the flip-flops 140, 142, 144 and 150 and the control unit 134 are all clocked by the Tx byte olock signal. Additionally, the decoder 130, the flip-flops 140, 142 and 144 and the control unit 134 all have RST inputs which are connected to receive the reset signal.

The control unit 134 is essentially a state machine and is shown in more detail in FIG. 7. It generates a MUX1S signal which is connected to the S input of the first multiplexer 114 (FIG. 6); a MUX2S signal which is connected to the S input of the second multiplexer 122, and SEL0, SEL1 and SEL2 signals connected, respectively, to the SEL0, SEL1 and SEL2 inputs of the multiplexer 116. The following signals from the remainder of the control portion 110 of the smoother form inputs to the control unit 134: I, I1, ALS, ALS1, JK, JK1, CNT=7, CNT<7 CNT=6, CNT<6 and TFLAG.

Referring to FIG. 7, the control unit 134 comprises three D flip-flops 170, 172 and 174, the Q outputs of which progress through several layers of combinatorial logic before the control unit outputs are obtained. The outputs SEL0, SEL1 and SEL2 are then fed back to the D inputs of the flip-flops, respectively, 170, 172 and 174. According to the invention, the values stored in the "state registers" 170, 172 and 174 represent the previous extension of the smoother, rather than the current extension of the smoother, the current extension being determined by the combinatorial logic only after the previous extension is latched. It will be seen that this technique reduces the latency of the control unit.

The control unit 134 as shown in FIG. 7 is capable of accommodating several situations. Like the smoother of FIG. 2, the apparatus of FIG. 7 will first of all insert an idle byte into a preamble when the smoother is initially in the normal state ($E_0$) and a JK arrives before the count in counter 132 reaches a first threshold value $I_{th1}=7$. Referring to FIG. 6, it can be seen that during the arrival of the short preamble bytes, since the control unit is in the normal state, SEL0 is active and the multiplxxer 116 selects the arriving stream directly onto the R_BUS. When the JK arrives, SEL1 becomes active and SEL0 becomes inactive. The signal MUX1S becomes active while the JK is in the arriving stream, so that for that one clock period, the multiplexer 114 selects the hard-wired idle byte onto its output. That signal is presented to the E1 input of multiplexer 116, which is selected onto the R_BUS due to the activation of the SEL1 signal. In the meantime, the JK byte which caused this occurrence is loaded into the register 112.

On the next clock cycle the JK output of decoder 130 is no longer active, so, referring to the AND gate 210 in FIG. 7, neither is the MUX1S signal. Thus the multiplexer 114 selects the output of register 112, which contains the JK byte, to the E1 input of multiplexer 116 for seleotion onto the R_BUS. As with the smoother of FIG. 2, the smoother of FIGS. 6 and 7 is now said to be in its first extended state ($E_1$) and all subsequent bytes which appear at the R_BUS 118 are delayed one clock period by the register 112.

While the smoother is in the first extended state, if a long preamble arrives, this is recognized by the presence of an idle byte in the arriving stream while the counter 132 is at a full count of $I_{th}=7$. When this occurs, on the next clock cycle, SEL1 goes inactive and SEL0 goes active. The incoming idle byte is loaded into register 112 like all preceding idle bytes, but unlike all preceding idle bytes, this one is thereafter discarded. This can be seen by referring to FIG. 8, which is a timing diagram showing the arrival of 8 idle bytes followed by a JK and a data byte DD1.

Figure 8:
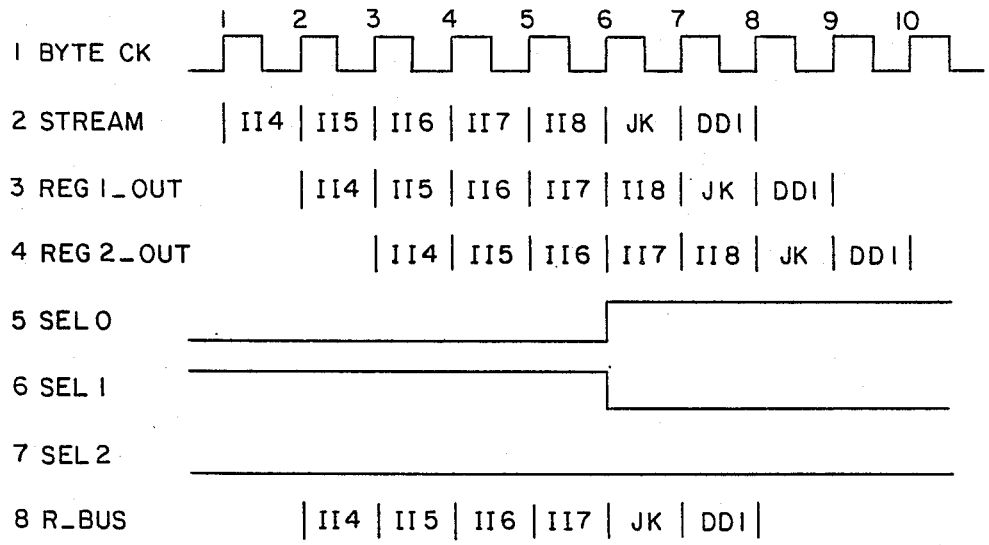

The byte clock is shown as the top line of FIG. 8. On the second line of FIG. 8 the arriving stream of bytes is shown, one byte per olock cycle. For example, the byte which is present on these lines after the first rising edge of the byte clock is the fourth idle byte (II4) in the preamble. After the sixth rising edge of the byte clock the JK appears, and the data byte DD1 appears after the seventh rising edge of the byte clook.

The third line of FIG. 8 shows the stream after it passes through the first delay register 112, and it can be seen that the output of REG1 trails the arriving stream itself by one clock period. Similarly, the fourth line of FIG. 8 shows the output of the second delay register 120, which trails the arriving stream by two clock cycles. The fifth, sixth and seventh lines of FIG. 8 show the SEL0, SEL1 and SEL2 outputs of control unit 134, respectively. The counter 132 (FIG. 6) reaches its full count of seven on the rising edge of the byte olock following the arrival of II7 in the arriving stream. This is the fifth rising edge shown in FIG. 8 of byte clock. On the sixth rising edge, since the count is at seven and the arriving stream contains another idle byte (II8), SEL1 drops to its inactive state and SEL0 becomes active. SEL2 remains low during the entire period depicted in FIG. 8.

The last line of FIG. 8 shows the sequence of bytes on the R_BUS output of the smoother. Prir to the sixth rising edge of the byte clock, since SEL1 was active and SEL0 was inactive, the multiplexer 116 selected the output of the first delay register 112 onto the R_BUS. Thus prior to the sixth rising edge of the byte clock, the R_BUS contained the same bytes as the output of the register 112 shown on the third line of FIG. 8. After the sixth rising edge of the byte clock, however, SEL1 was no longer active and SEL0 was active instead. Had this transition not occurred, II7 would be followed on the R_BUSby 118 since 118 follows II7 on the output of the delay register 112. However, since SEL0 was active, the multiplexer 116 selected the arriving stream directly onto the R_BUS instead. Thus the R_BUS received the JK byte shown in the second line of FIG. 8 following the sixth rising edge of the byte clock. As with the smoother of FIG. 2, the smoother of FIGS. 6 and 7 has now returned to its normal state ($E_0$), and all subsequent bytes appearing on the R_BUS 118 derive directly from the arriving stream. Effectively, the II8 byte is deleted.

Unlike the smoother of FIG. 2, the smoother of FIGS. 6 and 7 has a second extended state represented by an active SEL2 signal. The threshold for movement from extended state one ($E_1$) to extended state two ($E_2$) in the control portion 110 of the smoother is $I_{th2}=6$ bytes of idle preamble.

The occurrence of such a short preamble is recognized by the occurrence in the arriving stream of a JK byte while CNT is still less than 6. If the situation appears when the smoother was in the first extended state prior to the arrival of the preamble, then the process for moving into the second extended state and inserting an idle byte is much the same as the process is for moving from the normal state to the first extended state. That is, SEL2 becomes active (and SEL1 becomes inactive) during the period when the JK is in the arriving stream, and MUX2S becomes active for only the period in which JK is in the arriving stream. Thus when JK is in the arriving stream, the multiplexer 122 selects the hard-wired idle byte onto its output and the multiplexer 116 selects the output of multiplexer 122 onto the R_BUS. The idle byte (II5) which was previously in the first delay register 112 is loaded into the second delay register 120 on the next rising edge, while the JK byte is loaded into register 112. Since MUX2S is no longer aotive, the multiplexers 122 and 116 select the II5 byte onto the R_BUS. It is not until the following rising edge of the byte clock that the JK is loaded into the second delay register 120 and made available to the R_BUS 118. Effectively, therefore, the additional idle byte was inserted between the fourth and fifth idle bytes in the 5-byte preamble, and all subsequent bytes in the arriving stream are delayed by a second byte clock cycle.

Figure 9:
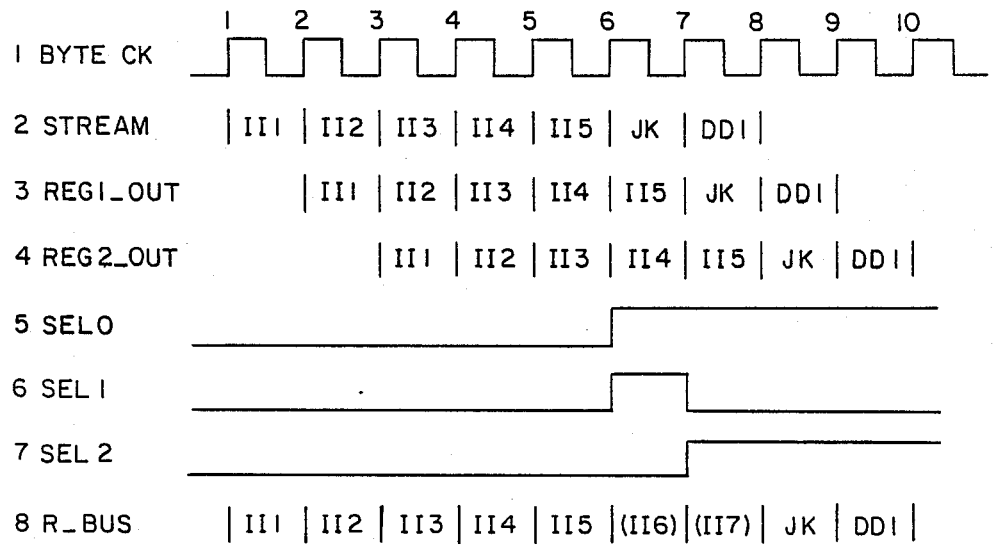

The apparatus of FIGS. 6 and 7 is also capable of adding two bytes to a single preamble which has fewer than six bytes of idle, assuming the smoother was initially in the normal state. FIG. 9 is a timing diagram showing how this takes place. The different lines of FIG. 9 are the same as the corresponding lines of FIG. 8. In FIG. 9, is it assumed that the arriving stream comprises a 5-byte preamble of idles followed by the JK byte and a DD1 data byte.

Initially the device is in the normal state, so SEL0 is active and SEL1 and SEL2 are inactive (low). The multiplexer 116 therefore selects II1 from the arriving stream directly onto the R_BUS 118. When the JK byte arrives in the arriving stream following the sixth rising edge of the byte clock, as shown in FIG. 9, the combinatorial logic shown in FIG. 7 immediately (i.e., without waiting for the next rising edge) forces SEL0 low and SEL1 high. AND gate 210 (FIG. 7) also causes the MUX1S output to go high for the one clock period in which JK is in the arriving stream. As previously explained, this state of MUX1S and SEL causes the multiplexers 114 and 116 to select a hard-wired idle byte onto the R_BUS 118 for the period in which JK is on the arriving stream. This is shown in FIG. 9 as an inserted I6 byte in parentheses.

Meanwhile, on the seventh rising edge of the byte clock, the JK byte which was in the arriving stream is loaded into the first delay register 112. All this occurs because CNT was less than seven when the JK arrived, as previously described. In fact, CNT was equal only to five. Since the number of idle bytes in the preamble was less than six, the SEL2 output of the control unit 134 becomes active on the seventh rising edge of the byte clock and the SEL1 output becomes inactive.

Since the JK was present in the arriving stream following the sixth rising edge, JK1 will become active on the output of the flip-flop 140 (FIG. 6) following the seventh rising edge. Thus, referring to the AND gate 212 in FIG. 7, MUX2S will also become active following the seventh rising edge of the byte clock. As previously described, activation of SEL2 and MUX2S causes the multiplexers 122 and 116 to select out onto the R_BUS 118 a hard-wired idle byte shown in FIG. 9 as I7 in parentheses.

In the meantime, on the eighth rising edge of the byte clock, the JK is latched into the second delay register 122. Since after the eighth rising edge of the byte clock JK1 is no longer active, MUX2S goes low and only SEL2 is high. Multiplexers 122 and 116 therefore select the JK in the register 120 onto the R_BUS 118 following the eighth rising edge of the byte clock.

On the ninth rising edge, the first data byte DD is loaded into the register 120 and immediately provided to the R_BUS by the multiplexers 122 and 116. The R_BUS thereafter continues to receive the information in the register 120 until such time as the smoother once again moves out of the second extended state. Thus, it can be seen that the smoother has effectively inserted two idle bytes I6 and I7 following the I5 byte and before the JK byte in the arriving stream, bringing the total number of preamble bytes to an acceptable level of seven.

If the smoother is in the second extended state and a preamble having more than the second threshold $I_{th2}=6$ bytes of preamble arrives, the smoother will drop back to the first extended state and delete one of the idle bytes. The smoother recognizes this situation as the occurrence of CNT=6 when the arriving byte is still an idle. If after the smoother has dropped back to the first extended state and CNT has incremented to seven, the arriving byte is still an idle, then the smoother will again delete an idle from the preamble and drop back to the normal state.

The process by which the smoother can contract twice to the normal state will now be explained in more detail with reference to the timing diagram of FIG. 10. The different lines in FIG. 10 are again the same as the different lines of FIG. 9 or FIG. 8.

In FIG. 10, it is assumed that the arriving stream consists of an 8-byte idle preamble followed by the JK and the first data byte DD1. The smoother is in the second extended state, so SEL2 is active and both SEL and SEL0 are inactive. Until the fourth rising edge of the byte clock, therefore, the multiplexers 122 and 116 select the output of register 120, the second delay register, onto the R_BUS.

On the fourth rising edge of the byte clock the counter reaches six, indicating that six idle bytes have been received. Since the following byte which enters decoder 130 (FIG. 6) is still an idle, specifically I7, the control unit 134 recognizes this and combinatorially brings SEL2 low and SEL1 high. During the clock period between the fourth and fifth rising edges, therefore, the multiplexers 114 and 116 select onto the R_BUS the output of the first delay register 112, which during that period contains I6.

On the fifth rising edge of the byte clock the counter reaches seven and the arriving byte becomes I8. The I8 byte is decoded by decoder 130 as still being an idle byte, and the combinatorial logic in the control unit 134 drops SEL1 to the inactive level and raises SEL0. Thus the byte which is selected onto the R_BUS between the fifth and sixth rising edges of the byte clock is I8, directly from the arriving stream. SEL0 remains active thereafter, and multiplexer 116 continues to select the arriving stream directly onto the R_BUS.

The smoother therefore has dropped back from the second extended state to the normal state in two steps, and the preamble bytes I5 and I7 were effectively deleted. The fact that the deleted preamble bytes were not the two bytes which immediately preceded the JK is irrelevant, since all idle bytes are interchangeable.

There are several other situations in which the smoother will drop back from the second extension either to the first extension or to the normal state, or from the first extension to the normal state. All involve the stripped frame situation, which is recognized as the arrival of an idle byte as the first NONDATA byte following a JK. The smoother takes advantage of these stripped frames to drop back into less extended states and correspondingly delete bytes from the end of the stripped frame.

FIG. 11 is a timing diagram showing how the smoother accomplishes this in one instance. It is assumed that the smoother is in the second extended state at the beginning of the timing diagram, and that the incoming stream comprises a 7-byte idle preamble (II1-II7), a JK byte, a 5-byte data sequence (DD1-DD5), followed immediately by the idles of the following preamble. There is no T or H byte between the last data byte, DD5, and the first idle byte, II1, indicating that the frame is a stripped frame. As will be seen, the smoother recognizes this and deletes the last two bytes of the stripped frame, correspondingly dropping itself back to the normal state.

At the beginning of the time period represented by the diagram of FIG. 11, SEL2 is high and both SEL1 and SEL0 are low. ALS and ALS1 are also low, having gone low following the second and third, respectively, idle bytes in the current preamble. Since the first byte in the arriving stream for the period depicted in FIG. 11 is II7, which is a NONDATA byte, the I and NONDATA signals are high prior to the second rising edge of the byte clock. The next byte in the arriving stream is the JK byte, so I goes low following the second rising edge. I1 goes low after the third rising edge, since I1 follows I by one byte clock period. Also on the third rising edge of the byte clock, since the immediately preceding byte in the stream is a JK, ALS goes high. ALS1 goes high on the fourth rising edge. Additionally, since the byte in the arriving stream following the third rising edge is a data byte, the NONDATA signal goes low following the third rising edge.

Until the eighth rising edge, since SEL2 is active, the multiplexers 122 and 116 route to the R_BUS the output of the second delay register 120. The control unit 134 is designed, however, such that if the parameter TFLAG is not active when the II1 byte arrives, at least the most recent data byte is deleted and the smoother moves into a less extended state. TFLAG is the Q output of flip-flop 150, and indicates proper termination of the data packet. TFLAG becomes active on the rising edge following the arrival of a NONDATA byte which is not also an idle byte, while ALS1 is active. The output of AND gate 146 (FIG. 6) goes high when such a byte arrives, thereby activating the D input of flip-flop 150 in time for the next rising edge of the byte clock. The requirement that ALS1 be active when the NONDATA byte arrives adds the further guarantee that TFLAG will not go active following even a proper terminating byte, if the data packet was less than two bytes long. This is because ALS1 does not become active until the second data byte folloWing a JK.

Referring again to FIG. 11, the first idle byte arrives in the arriving stream following the eighth rising edge of the byte clock. The I signal therefore rises at that point, and I1 goes active on the ninth rising edge. Also, since II1 is a NONDATA byte, the NONDATA signal goes active following the eighth rising edge. Since TFLAG is inactive, indicating that the previous frame was a stripped frame, the combinatorial logic in the control unit 134 quickly brings SEL2 low and SEL0 high for the duration of the clock period between the eighth and ninth rising edges. After having received DD3 in the period prior to the eighth rising edge, therefore, the R—BUS receives II1 directly from the arriving stream prior to the ninth rising edge. For the remainder of the time period shown in FIG. 11, R—BUS continues to receive the bytes directly from the arriving stream. The two bytes which have effectively been deleted are DD4 and DD5, which are the last two bytes of the stripped frame.

As will be seen, if the smoother was peviously in the first extended state instead of the second extended state, the logic in control unit 134 is designed to drop back to the normal state and delete only the last byte at the end of a stripped frame. Additionally, if the smoother was previously in the second extended state and a data packet consisting of only a JK byte arrives, the smoother will drop back to the first extended state and only the JK will be deleted. The latter situation is recognized by the concurrence of I1 and ALS1 when SEL2 is active and TFLAG is inactive. By referring to I1 and ALS1 instead of I and ALS, the apparatus ensures that the JK byte is in the second delay register 120 when the extension drops back from two to one. Thus it is the JK byte which is discarded.

Referring to FIG. 7, the design of the control unit 134 of the smoother of FIG. 6 will now be explained. The intermediate signals generated in the combinatorial logic in the control unit 134 are given designations which indicate their purpose. Each of these designations, such as "ESEL2a", includes a prefix E, N or C; the designation "SEL"; followed by a numerical digit 1 or 2. The numerical digit represents the level of extension to which the system will move when the particular signal is active, and the prefixes C or E represent whether the smoother must contract or expand, respectively, to reach the state indicated by the numerical digit. The prefix of N indicates that no change is required from the current level of extension. Some of the intermediate signals also carry a suffix a, b, c or d. These suffixes serve merely to differentiate signals which would otherwise carry the same designation.

In general organization, the OR gates 204, 206 and 208 generate the SEL2, SEL1 and SEL0 signals, respectively, indicating the level of extension of the smoother. OR gate 206 has as inputs CSEL1, ESEL1 and a signal which is in effect a protected version of NSEL1 as described below. Thus the OR gate 206 generates an active SEL1 signal if the smoother is moving to the first extended state from either state zero (ESEL1 active) or from state two (CSEL1 active). SEL1 will also be active if the protected version of NSEL1 is active.

Similarly, OR gate 208 will activate the SEL0 output if the smoother is contracting either from the second extended state or from the first extended state, to the normal state (CSEL0 active), or if the protected version of NSEL0 is active. OR gate 204 activates SEL2 if the smoother is expanding either from the first extended state or from the normal state to the second extended state (ESEL2 active), or if the protected version of NSEL2 is active.

As previously mentioned, the control unit 134 generates SEL0, SEL1 and SEL2 as a combinatorial result of system conditions then existing. Generating the SEL signals as a straight combinatorial consequence of the system conditions is advantageous since it reduces the latency of the system. The inputs to the combinatorial portion of the control unit 134 further include the previous state of the SEL0, SEL1 and SEL2 outputs as latched in the registers 170, 172 and 174, respectively (FIG. 7.). These are provided as inputs to the combinatorial circuitry via signals NSEL0, NSEL and NSEL2, respectively. If these signals formed direct inputs to the OR gates 204, 206 and 208, then during any given cycle in which the smoother is changing states, e.g., between two rising edges i and i+1 of the byte clock, the OR gates 204, 206 and 208 would activate both the SEL signal for the destination state of the smoother as well as the SEL signal corresponding to the previous state. This is true because the NSEL signals do not change until the rising edge of the following clock cycle (i.e., rising edge i+1). This is unacceptable because only one of the SEL signals may be active at a time.

In order to prevent this occurrence, according to the invention, AND gates 198, 200 and 202 are provided to protect respective OR gates 204, 206 and 208 from the latched signals NSEL2, NSEL1 and NSEL0 if the smoother is moving to any other state. Thus the protected version of NSEL2 which feeds OR gate 204, is the logical product of NSEL2, CSEL0c and CSEL1. (Note that CSEL0 could be used in place of CSEL0c). Similarly, the protected version of NSEL1 is calculated as the logical product of NSEL1, ESEL2 and CSEL0. The protected version of NSEL0 is caloulated as the logical product of NSEL0 and ESEL1. Intermediate smoother signals other than those mentioned for each of the AND gates 198, 200 and 202 are not necessary to guarantee exclusivity of the SEL outputs, since the designation states represented by these intermediate signals cannot be reached in one byte clock cycle from the state represented by the NSEL signal feeding eaoh respective AND gate. For example, NSEL0 need not be ANDed with ESEL2 since no transitions are defined in the FIG. 7 embodiment for the smoother to move directly from the normal state to the second extended state. The smoother can move from the normal state to the second extended state only via the first extended state, and NSEL0 is off when the smoother is in the first extended state. ESEL2 is, however, ANDed with the NSEL1 signal in the generation of SEL1.

The AND gates 176, 178, 180, 182, 184, 186 and 188 generate a plurality of intermediate signals which are subsequently OR'ed together by OR gates 190, 194 and 196 to generate some of the intermediate signals used in the last two levels of logic of FIG. 7. Each of these AND gates recognizes a single system condition designated to contract or extend the smoother, and activates its output line only when that particular condition exists. For example, AND gate 188 recognizes a preamble of at least eight idles (by recognizing CNT=7 and arriving byte equal I) when the smoother is in the first extended state (NSEL1 active). AND gate 188 activates an intermediate signal CSEL0a when this system condition occurs, since the smoother must contract (hence the C) to the normal state (hence the 0) when this condition occurs. Similarly, AND gate 184 activates a signal CSEL0d upon the concurrence of I, ALS, NSEL1 and $\overline{\text{TFLAG}}$, for contracting and deleting the last byte of a stripped frame. AND gate 180 generates a CSEL0c signal for contracting the smoother from the second extended state to the normal state and deleting the last two bytes of a stripped frame, by recognizing the concurrence of I, NSEL2, ALS1 and $\overline{\text{TFLAG}}$. Since the smoother should contract to the normal state whenever any of the signals CSEL0a, CSEL0d or CSEL0c are active, these three signals are combined in OR gate 194 to generate the CSEL0 signal previously described.

Similarly, AND gate 186 recognizes the system condition for contracting the smoother from the second extended state to the first extended state upon arrival of a preamble having more than six idle bytes. It accomplishes this by activating the signal CSEL1a upon the concurrence of I and CNT=6 while NSEL1 is active. AND gate 182 recognizes the condition for dropping back from the second extended state to the first extended state in order to delete the JK byte of a stripped frame which already consists of only the JK byte. AND gate 182 therefore activates a signal CSEL1b upon the concurrence of I1, ALS1, NSEL2 and $\overline{\text{TFLAG}}$. The signals CSEL1a and CSEL1b are OR'ed together in OR gate 196 to generate the CSEL1 signal.

There is only one system condition in which the smoother will extend to the first extended state, namely the arrival of a JK before the number of idle bytes in a preamble reaches seven. AND gate 192 therefore generates the ESEL1 signal directly from the concurrence of JK, CNT<6 and NSEL0.

Finally, there are two system conditions in which the smoother extends to the second extended state. AND gate 178 recognizes the arrival of a preamble having less than six idle bytes when the smoother was previously in the first extended state prior to the arrival of the first idle byte in the preamble. AND gate 178 therefore generates an ESEL2b signal which is active upon the concurrence of JK, CNT<6 and NSEL1.

AND gate 176 recognizes the arrival of a preamble having fewer than six idle bytes when the smoother was in the normal state prior to the arrival of the first idle byte in the preamble. As previously explained, when the smoother is initially in the normal state and a preamble having fewer than six bytes of idle arrives, the smoother first recognizes (by AND gate 192) that the count is less than seven when JK arrives, consequently moving to the first extended state and inserting one byte of idle. Only on the next byte clock cycle does the smoother recognize that the preamble also had fewer than six bytes of idle, in which case the smoother extends from the first extended state to the second extended state and inserts a second idle. AND gate 176 is the component which recognizes the system condition leading to this second extension, by activating the ESEL2a signal upon the concurrence of JK1, CNT=6 and NSEL1. The signals ESEL2b and ESEL2a are ORed together by OR gate 190 to generate the ESEL2 signal.

Whereas the circuitry shown in FIG. 7 uses two steps to insert the two idle bytes while extending from the normal state to the second extended state, it will be understood that circuitry may also be devised in which this takes place in a single clock cyle.

The apparatus described up to this point has been concerned with maintaining a minimum inter-packet gap size of, for example, approximately seven bytes of idle. The invention may also be used, however, for maintaining a maxium inter-packet gap size. Such use would find utility, for example, in networks involved with the transmission of data representing voice or video. This type of transmission usually has a fixed "frame" size, meaning in this case the number of bytes from the beginning of a preamble to the end of the immediately subsequent data packet.

Figure 12:
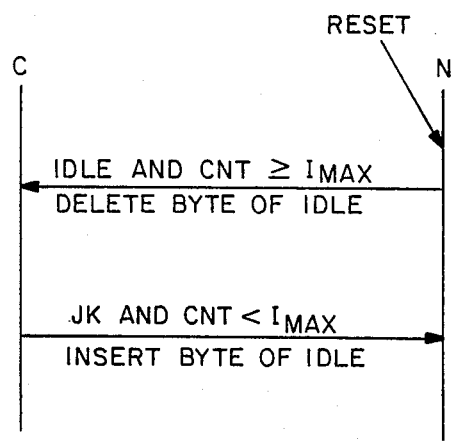
FIG. 12 is a state diagram for another smoother according to the invention.

The control circuitry for a simple smoother for performing a low-pass function, tending to keep the number of bytes in a preamble below a threshold value $I_{max}$ may be construoted according to the state diagram shown in FIG. 12. Two states are shown in FIG. 12, a normal state (N) and a contracted state (C). The data path delay portion of the smoother is designed such that bytes are normally passed through one delay register before they are provided to the output bus, and only when the control portion is in the contracted state does the data path delay portion pass the incoming byte stream directly to the output bus.

The low-pass smoother is initialized or reset into the normal state, where it repeatedly counts bytes of incoming idles. The nomenclature in FIG. 12 assumes that the counter is an up counter which counts from zero to $I_{max}$ and stops. The apparatus remains in the normal state until the counter output CNT reaches $I_{max}$, and if the incoming byte is still an idle, the smoother moves to the contracted state. As with the high-pass smoothers previously described, the byte which is in a delay register when the smoother contracts to a level of extension prior to that register is discarded and effectively deleted. When the smoother is in the contracted state and a short preamble arrives, i.e., JK arrives before CNT reaches $I_{max}$, the smoother moves to the normal state and inserts a byte of idle in the same manner as the high-pass smoothers previously described.

Figure 13:
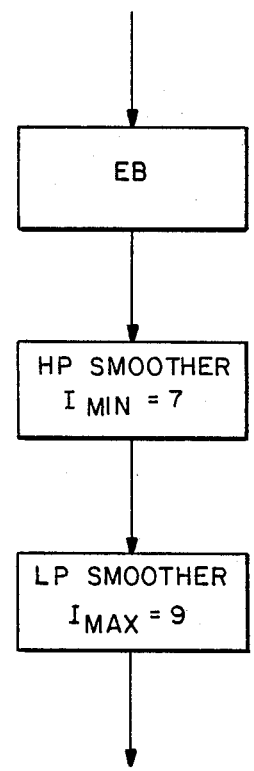
Figure 14:
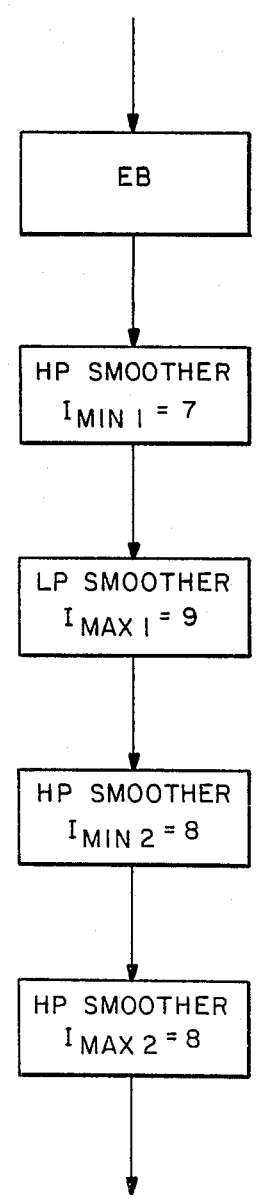

As with high-pass smoothers, low-pass smoothers may be cascaded with the same or differing thresholds in order to more reliably tend the inter-packet gap size to a size below a desired maximum. Moreover, high-pass and low-pass smoothers may be cascaded with each other in order to tend the inter-packet gap size to a desired central size. FIG. 13 shows is a structure having a high-pass smoother with threshold $I_{min}=7$, followed by a low-pass smoother having a threshold $I_{max}=9$. This construction tends the number of idles in inter-packet gaps toward eight bytes plus or minus one byte. FIG. 14 shows a construction which even more closely restricts packet arrival jitter to eight bytes of inter-packet idle. It comprises following the elasticity buffer a high-pass smoother having a threshold of $I_{min1}=7$, a low-pass smoother having a threshold of $I_{max1}=9$, a second high-pass smoother having a threshold $I_{min2}=8$ and a second low-pass smoother having a threshold $I_{max2}=8$.

As with the solely high-pass smoothers previously described, cascaded low-pass smoothers and cascaded smoothers including both high-pass and low-pass types may be combined to operate in a single functional unit. In the latter case, the smoother may be considered to have one normal state, one or two or more extended states and one or two or more contracted states. Or, seen from a more general perspective, a smoother may have a plurality of states $S_1, \ldots, S_{EMAX}$, each $S_i$ of which represents a state having greater extension than the state $S_{i-1}$. Whether the smoother is high-pass or low-pass or a combination depends on how many states are provided at thresholds above the originating station IPG size and how many states are provided at thresholds below the originating station IPG size. the central state is then considered the normal state, each state having a higher extension than the normal state being an extended state, and each state having a lower extension than the normal state being a contracted state. Thus if the normal state $S_N$ is $S_1$, the smoother is a high-pass smoother and has only extended states. If the normal state $S_N$ is $S_{EMAX}$, then the smoother is entirely a low-pass smoother and all states are contracted states. Finally, if $1 < N < EMAX$, then the smoother is a combined high-pass and a low-pass smoother having both extended and contracted states.

Moreover, recalling that different states may have different thresholds, another way of describing a smoother according to the invention is to say that the smoother has $n_1$ extended states at a first threshold, $n_2$ extended states at a second threshold, $n_3$ contracted states at a third threshold, $n_4$ contracted states at a fourth threshold, and so on. It will be understood that when a smoother incorporates several extended or contracted states at a single threshold, it may be worthwhile to implement the invention using a counter, instead of a state machine, to keep track of which extended or contracted state for the current threshold is currently in force.

As previously mentioned, the FDDI standard defines a maximum frame size and a maximum percentage by which any station's clock frequency may vary from a nominal value. These quantities are defined in the FDDI standard such that in the most extreme case, an elastic buffer will never have to delete (or add) more than an average of 4.5 bits of idle per frame. In a network without smoothers, depending on the arrangement of stations and the differences in their clock frequencies, it can be shown that the long term average gap length over the entire network will always fall within the range of (8 bytes ±4.5 bits) per preamble. Stated more generally, the long-term average gap length for any given smootherless network will always fall between the minimum and maximum worst case average gap lengths, inclusive. The minimum worst case averaqe gap length is the originating station's gap length minus the long term average of the number of bytes that the most extreme legal deleting station will delete, and the maximum worst case average gap length is the originating station's gap length the long term average of the number of bytes that the most extreme adding station will add.

It has been found that it is ineffective to incorporate into a network smoothers which attempt to ensure a minimum gap length longer than the minimum worst case average gap length or shorter than the maximum worst case average gap length. If such a network is attempted, it has been found that the smoothers spend too much of their time in the extended state(s) (contracted state(s) for a smoother assuring a maximum gap length) and are not available to lengthen enough short preambles (shorten enough long preambles). In smoothers assuring a minium gap length, therefore, the threshold(s) should be set at some value shorter than or equal to the minimum worst case average gap length. Similarly, in smoothers assuring a maximum gap length, the threshold(s) should be set at some value longer than or equal to the maximum worst case average gap length.

The invention has been described with respect to particular embodiments thereof, and it will be understood that numerous modifications may be made within the scope of the invention. For example, the functions of the smoother according to the invention may be combined with the elasticity buffer for a more compact if more complex. structure. These and other variations are intended to be within the scope of the claims.

I claim:

1. Smoothing apparatus for use with an arriving stream of inactive and active informational units, said stream including strings of said inactive units, each of said strings being preceded and followed by one of said active units, said apparatus comprising:

initialization means for initializing said apparatus;

adding means for adding a number $n_a$ of inactive idle units to a first given one of said strings of inactive units, wherein said first given one of said strings has a number $I_1$ of inactive units, $I_1$ being less than a predetermined minimum threshold number $I_{min}$ of inactive units, $n_a$ being between 1 and $(I_{min}I_1)$ inclusive; and deleting means for deleting a number $n_d$ of inactive units from a second given one of said strings of inactive units, wherein said second given one of said strings has a number $I_2$ of inactive units, $I_2$ being greater than said minimum threshold number $I_{min}$, $n_d$ being between 1 and $(I_2 - I_{min})$ inclusive, $n_a$ being further limited such that, after said number $n_a$ of inactive units are added to said first given one of said strings, the total number of inactive units added by said smoothing apparatus since initialization, net of the total number of inactive units deleted by said smoothing apparatus since initialization, does not exceed a predetermined maximum value $E_{max}$, said adding means being inoperative on said first given one of said strings if the addition of even one inactive unit to said first given one of said strings would result in said total number of inactive units added by said smoothing apparatus since initialization, net of said total number of inactive units deleted by said smoothing apparatus since initialization, exceeding said predetermined maximum value $E_{max}$, and $n_d$ being further limited such that, after said number $n_d$ of inactive units are deleted from said second given one of said strings, said total number of inactive units added by said smoothing apparatus since initialization, net of said total number of inactive units deleted by said smoothing apparatus since initialization, does not fall below a predetermined minimum value $E_{min}$, said deletig means being inoperative on said second given one of said strings if the deletion of even one inactive unit from said second given one of said strings would result in said total number of inactive units added by said smoothing apparatus since initialization, net of said total number of inactive units deleted by said smoothing apparatus since initialization, falling below said predetermined minimum value $E_{min}$.

2. Apparatus according to claim 1, wherein $E_{min}=0$ and $E_{max}>0$.

3. Apparatus according to claim 1, wherein $E_{min}<0$ and $E_{max}=0$.

4. Apparatus according to claim 1, wherein $E_{min}<0$ and $E_{max}>0$.

5. Apparatus according to claim 1,
wherein $I_{min}$ is predetermined to be equal to a first predetermined value $I_{min1}$ if prior to the operation of said adding means or said deleting means the total number of inactive units added by said smoothing apparatus since initialization, net of the total number of inactive units deleted by said smoothing apparatus since initialization, is equal to a first predetermined number,
and wherein $I_{min}$ is predetermined to be equal to a second predetermined value $I_{min2}$, $I_{min2}$ being different from $I_{min1}$, if prior to the operation of said adding means or said deleting means the total number of inactive units added by said smoothing apparatus since initialization, net of the total number of inactive units deleted by said smoothing apparatus since initialization, is equal to a second predetermined number greater than said first predetermined number.

6. Apparatus according to claim 5, wherein said second predetermined number is exactly one greater than said first predetermined number, wherein $I_{min1}$ is less than or equal to the minimum worst case average gap length of said apparatus, and wherein $I_{min2}=I_{min1}-1$.

7. Apparatus according to claim 5,
wherein said adding means comprises:
first means for adding one inactive unit to said first given one of said strings of inactive units only if $I_1<I_{min1}$; and
second means for adding one inactive unit to said first given one of said strings of inactive units only if, after any operation of said first means for adding one inactive unit, said first given one of said strings has fewer than $I_{min2}$ inactive units, said second means for adding one inactive unit operating serially with said first means for adding one inactive unit,
and wherein said deleting means comprises:
first means for deleting one inactive unit from said second given one of said strings of inactive units only if $I_1>I_{min1}$; and
second means for deleting one inactive unit from said second given one of said strings of inactive units only if, after any operation of said first means for deleting one inactive unit, said second given one of said strings has more than $I_{min2}$ inactive units, said second means for deleting one inactive unit operating serially with said first means for deleting one inactive unit.

8. Apparatus according to claim 1, further comprising additional deleting means for deleting at least one active informational unit upon the occurrence of a predetermined system condition.

9. Apparatus according to claim 1, wherein each of said inactive and active informational units comprises a 10-bit byte.

10. Apparatus according to claim 1, for use with a clock having a clock period,
wherein said adding means comprises:
data path delay means for delaying said stream of inactive and active informational units by a selectable integral number of said clock periods, said selectable integral number being selectable at least to any integer between 0 and $(E_{max}-E_{min})$ inclusive; and
control means for providing said selectable integral number to said data path delay means, said control means including means, active when said first given one of said strings of inactive units is passing through said data path delay means, for causing an extra inactive unit to be output during one clock period and for correspondingly incrementing said selectable integral number for subsequent clock periods,
and wherein said deleting means comprises said data path delay means and said control means, said control means further including means for decrementing said selectable integral number when said second given one of said strings of inactive units is passing through said data path delay means.

11. Smoothing apparatus for use with a clock having a clock period and with a stream of informational units arriving at one unit per clock period, said stream including strings of inactive units each preceded and followed by an active unit, said apparatus having a normal state $Ef_0$ and a number EMAX of extended states $E_i$, $i=1,\ldots,EMAX$, each extended state $E_i$ representing a state of greater extension than the state $E_{i-1}$, the current state prior to the arrival of any one of said strings being represented by the c'th state $E_c$, said apparatus comprising:
initialization means for initializing said current state $E_c$ to said normal state $E_0$; and
first adding/deleting means for, only if said current state $E_c$ is less extended than the state $E_{EMAX}$, adding a number $n_a$ of inactive units to a first one of said strings of inactive units previously having a number $I_{short}$ of inactive units, $I_{short}$ being less than a first threshold number $I_{th1}$ of inactive units and $1 \leq n_a \leq (EMAX - c)$, and correspondingly moving said current state $E_c$ to the state $E_{c+n_a}$, and for, only if said current state $E_c$ is more extended than said normal state $E_0$, deleting a number $n_d$ of inactive units from a second one of said strings of inactive units previously having a number $I_{long}$ of inactive units, $I_{long}$ being greater than said first threshold number $I_{th1}$ of inactive units and $1 \leq n_d \leq c$, and correspondingly moving said current state $E_c$ to the state $E_{c-n_d}$.

12. Apparatus according to claim 11, wherein $n_a$ is further limited to be less than or equal to $(I_{th1}-I_{short})$, and wherein $n_d$ is further limited to be less than or equal to $(I_{long}-I_{th1})$.

13. Apparatus according to claim 11, wherein $n_a$ is equal to the lesser of $(EMAX-c)$ and $(I_{th1}-I_{short})$, and wherein $n_d$ is equal to the lesser of c and $(I_{long} - I_{th1})$.

14. Apparatus according to claim 13, wherein said apparatus further has an additional normal state $E_0'$ and a number EMAX' of additional extended states $E_i'$, $i=1,\ldots,EMAX'$, each extended state $E_i'$ representing a state of greater extension than the state $E_{i-1}'$, the current additional state prior to arrival of any one of said strings being represented by the (c')th additional state $(E_{c'})'$,
wherein said initialization means further comprises means for initializing said additional current state $(E_{c'})'$ to said additional normal state $E_0'$, said apparatus further comprising second adding/deleting means operating at least functionally downstream of said first adding/deleting means, said second adding/deleting means being for, only if said additional current state $(E_{c'})'$ is less extended than the state $E_{EMAX'})'$, adding a number $n_a'$ of inactive units to a third one of said strings of inactive units, said third one of said strings being one which had, following any operation of said first adding/deleting means, a number of inactive units which is less than a second threshold number $I_{th2}$ of inactive units, $1 \leq n_a' \leq (EMAX' - c')$, and correspondingly moving said additional current state $(E_{c'})'$ to a more extended state by $n_a'$ states, and for, only if said additional current state $(E_{c'})'$ is more extended than said additional normal state $E_0'$, deleting a number $n_d'$ of inactive units from a fourth one of said strings of inactive units, said fourth one of said strings of inactive units being one which had, following any operation of said first adding/deleting means, a number of inactive units which is greater than said second threshold number $I_{th2}$ of inactive units, $1 \leq n_d' \leq c'$, and correspondingly moving said additional current state $(E_{c'})'$ to a less extended state by $n_d'$ states.

15. Apparatus according to claim 14, wherein said second threshold number $I_{th2}$ is exactly one less than said first threshold number $I_{th1}$.

16. Smoothing apparatus for use with a clock having a clock period and with a stream of informational units arriving at one unit per clock period, said stream including strings of inactive informational units each preceded and followed by an active informational unit, said apparatus having a normal state N and a first extended state $E_1$, said apparatus comprising:

an input bus carrying said stream of informational units;

an output bus; and transfer means for transferring informational units from said input bus to said output bus, said transfer means including control means for, during the transfer of each of said strings of inactive informational units having fewer than a first threshold number $I_{th1}$ of said inactive informational units, only if said apparatus is in said normal state N, supplying an extra inactive informational unit to said output bus during a first one of said clock periods, delaying the transfer of subsequently arriving informational units by one of said clock periods and moving said apparatus to said first extended state $E_1$, and for, during the transfer of each of said strings of inactive units having more than $I_{th1}$ of said inactive informational units, only if said apparatus is in said first extended state $E_1$, preventing the transfer of one of said inactive informational units by advancing the transfer of the next and subsequently arriving informational units by one of said clock periods and moving said apparatus to said normal state N.

17. Apparatus according to claim 16, said apparatus further having a second extended state $E_2$, said control means further being for, during the transfer of each of said strings of inactive informational units having fewer than a second threshold number $I_{th2}$ of said inactive informational units, only if said apparatus is in said first extended state $E_1$, supplying an extra inactive informational unit to said output bus during a second one of said clock periods, delaying the transfer of subsequently arriving informational units by an additional one of said clock periods and moving said apparatus to said second extended state $E_2$, and for, during the transfer of each of said strings of inactive informational units having more than $I_{th2}$ of said inactive informational units, only if said apparatus is in said second extended state $E_2$, preventing the transfer of one of said inactive informational units by advancing the transfer of the next and subsequently arriving informational units by one of said clock periods and moving said apparatus to said first extended state $E_1$.

18. Apparatus according to claim 17, wherein $I_{th1} = 7$ and $I_{th2} = 6$.

19. Smoothing apparatus for use with an output bus, a clock having a clock period and an input bus carrying a stream of informational units arriving at one unit per clock period, said stream including strings of inactive infrmational units each preceded and followed by an active informational unit, said apparatus comprising:

(a) a delay register having a data output, a data input coupled to receive said stream of informational units, and a clock input coupled to receive said clock;

(b) a multiplexer having a data output, a first data input coupled to said data output of said delay register, a second data input coupled to said data input of said delay register, a third data input hardwired to logic levels representing an inactive informational unit, and a control port, said multiplexer selecting to said data output of said multiplexer the data on said first data input in response to an SEL_E signal on said control port, said second data input in response to an SEL_N signal on said control port and said third data input in response to an SEL_I signal on said control port; and (c) control circuitry having an output coupled to said control port of said multiplexer, (i) said control circuitry including a state machine having a normal state and an extended state, said state machine, when in said normal state, being adapted to move to said extended state for the second clock period following the clock period in which the last unit of each string of inactive informational units shorter than a predetermined threshold length $I_{th}$ is present on said input bus, said state machine, when in said extended state, being adapted to move to said normal state for the second clock period following the clock period in which the $I_{th}'$th unit of each string of inactive informational units longer than said predetermined threshold length $I_{th}$ is present on said input bus, (ii) said control circuitry further including means for applying to said control port of said multiplexer during each given clock period: (A) said SEL_E signal whenever said state machine is in said extended state and said clock period is not the second clock period following the clock period in which the $I_{th}'$th unit of a string of inactive informational units longer than said predetermined threshold length $I_{th}$ is present on said input bus; (B) said SEL_N signal whenever said state machine is in said normal state and said given clock period is not the second clock period following the clock period in which the last unit of a string of inactive informational units shorter than said predetermined threshold length $I_{th}$ is present on said input bus; (C)

said SEL—N signal whenever said state machine is in said extended state and said given clock period is the second clock period following the clock period in which the $I_{th}$'th unit of a string of inactive informational units longer than said predetermined threshold length $I_{th}$ is present on said input bus; and (D) said SEL—I signal whenever said state machine is in said normal state and said given clock period is said second clock period following the clock period in which the last unit of a string of inactive informational units shorter than said predetermined threshold length $I_{th}$ is present on said input bus.

20. A method for controlling the lengths of interpacket gaps in a data network comprising a plurality of independently clocked nodes, continuous streams of informational units being passed among said nodes, said streams including packets of active informational units separated by interpacket gaps of inactive informational units, a given one of said nodes including a receive clock having a receive clock period, a transmit clock having a transmit clock period and an elastic buffer for receiving one of said streams of informational units at a rate of one unit per receive clock period, for making active informational units from said stream available at a rate of one unit per transmit clock period, and for making inactive informational units available at said rate of one unit per transmit clock period, at least some of said inactive informational units made available by said elastic buffer forming interpacket gaps having lengths adjustable by said elastic buffer to compensate for mismatch between said receive clock period and said transmit clock period, said method comprising the steps of:

detecting the occurrence in said informational units made available by said elastic buffer of a first short interpacket gap having fewer than a threshold number $I_{short1}$ of inactive informational units;

inserting during a first adding time period a number $n_{1a}$ of inactive informational units in said first short interpacket gap and correspondingly delaying by $n_{1a}$ of said transmit clock periods informational units made available by said elastic buffer subsequently to said first time period;

detecting the occurrence in said informational units made available by said elastic buffer of a first long interpacket gap having more than a threshold number $I_{long1}$ of inactive informational units; and deleting during a first deleting time period a number $n_{1d}$ of informational units from said long interpacket gap and correspondingly advancing by $n_{1d}$ transmit clock periods informational units made available by said elastic buffer subsequently to said first deleting time period.

21. A method aooording to claim 20, further comprising the steps of:

detecting the occurrence in said informational units made available by said elastic buffer of a second short interpacket gap having fewer than a threshold number $I_{short2}$ of inactive informational units;

inserting during a second adding time period a number $n_{2a}$ of inactive informational units in said second short interpacket gap and correspondingly delaying by $n_{2a}$ transmit olock periods informational units made available by said elastic buffer subsequently to said second adding time period;

detecting the occurrence in said informational units made available by said elastic buffer of a second long interpacket gap having more than a threshold number $I_{long2}$ of inactive informational units; and deleting during a second deleting time period a number $n_{2d}$ of informational units from said second long interpacket gap and correspondingly advancing by $n_{2d}$ transmit clock periods informational units made available by said elastic buffer subsequently to said second deleting time period;

where $I_{short1} \neq I_{short2}$
and $I_{long1} \neq I_{long2}$.

22. A method according to claim 21, where $I_{short1} = I_{long1}$,
$I_{short2} = I_{long2}$, and
$I_{short2} = I_{short1} - 1$.

23. A method according to claim 21, wherein $I_{short1} = I_{long1}$.

24. A method according to claim 23, further comprising the steps of:

keeping track of the current number of transmit clock periods by which informational units made available by said elastic buffer are delayed;

limiting $n_{1a}$ such that said current number of transmit clock periods never exceeds a predetermined maximum number; and limiting $n_{1d}$ such that said current number of transmit clock periods never falls below a predetermined minimum number.

25. A method aoording to claim 24, for use where it is desired to control the lengths of interpacket gaps to reduce the number of said interpacket gaps which are shorter than a desired minimum length, wherein $I_{short1}$ is greater than said desired minimum length 26. A method according to claim 23, further comprising the steps of:

detecting the occurrence in said informational units made available by said elastic buffer of a stripped frame; and deleting during a third deleting time period a number $n_{3d}$ of informational units from said stripped frame and correspondingly advancing by $n_{3d}$ transmit clock periods informational units made available by said elastic buffer subsequently to said third deleting time period.

27. A method for controlling the lengths of interpacket gaps in a data network, continuous streams of informational units being transmitted in said data network at a rate of one unit per informational unit clock period, said streams including packets of active informational units separated by interpacket gaps of inactive informational units, said method comprising the steps of:

detecting the occurrence in a given one of said streams of informational units of a first short interpacket gap having fewer than a threshold number $I_{short1}$ of inactive informational units;

inserting during a first adding time period a number $n_{1a}$ of inactive informational units in said first short interpacket gap and correspondingly delaying by $n_{1a}$ of said informational unit clock periods informational units appearing in said given stream subsequently to said first adding time period;

detecting the occurrence in said given one of said streams of a first long interpacket gap having more than a threshold number $I_{long1}$ of inactive informational units; and deleting during a first deleting time period a number $n_{1d}$ of informational units from said first long interpacket gap and correspondingly advancing by $n_{1d}$ of said informational unit clock periods informational units appearing in said given one of said streams subsequently to said first deleting time period.

28. A data network for carrying a stream of informational units, said stream including separated strings of inactive informatioanl units, said network including an adjusting component which occasioally adjusts the length of said strings of inactive informational units, said data network further including downstream of said adjusting component, a high pass smoother having a normal state $E_0$ and a number EMAX of extended states $E_i$, $i = 1, \ldots$, EMAX, each extended state $E_i$ representing a state of greater extension than the state $E_{i-1}$, the current state prior to the arrival of any one of said strings being represented by the c'th state $E_c$, said smoother comprising adding/deleting means for, only if said current state $E_c$ is less extended than the state $E_{EMAX}$, adding a number $n_a$ of inactive units to a first one of said strings of inactive units previously having a number $I_{short}$ of inactive units, $I_{short}$ being less than a threshold number $I_{th}$ of inactive units and $1 \leq n_a \leq (EMAX-c)$, and correspondingly moving said current state $E_c$ to the state $E_{c+n_a}$, and for, only if said current state $E_c$ is more extended than said normal state $E_O$, deleting a number $n_d$ of inactive units from a second one of said strings of inactive units previuously having a number $I_{long}$ of inactive units, $I_{long}$ being greater than said threshold number $I_{th}$ of inactive units and $1 \leq N_D \leq c$, and correspondingly moving said current state $E_c$ to the state $E_{c-n_d}$.

29. A network according to claim 28, wherein said smoother is disposed to function immediately downstream of said adjusting component.

30. A network according to claim 28, wherein said network includes several of said adjusting components, and wherein each of said several of said adjusting components is followed immediately downstream by a respective one of said smoothers.

31. A network according to claim 28, wherein said network includes a plurality of stations, each of said stations having a data input port coupled to receive data from said network and processing apparatus for processing data received by the data input port of said station, one of said adjusting components operating between the data input port and the processing apparatus of each of said stations, wherein said network further includes one of said smoothers operating between the adjusting component and the processing apparatus of each of said stations.

32. A network according to claim 31, wherein each of said adjusting components is an elastic buffer.

33. A data network for carrying a stream of informational units, said stream including separated strings of inactive informational units, said network operable according to a protocol specifying a desired central number of inactive informational units for each of said strings, said network including an adjusting component which occasionally adjusts the length of said strings of inactive informational units, said data network further including, downstream of said adjusting component, a band pass smoother having a normal state $S_O$, a number EMAX of extended states $S_i$, $i=1, \ldots$, EMAX and a number CMAX of contracted states $S_j$, $j=-1, \ldots$, $-CMAX$, each state $S_i$ representing a state of greater extension than the state $S_{i-1}$, $i = -CMAX, \ldots$, EMAX, the current state prior to the arrival of any one of said strings being represented by the c'th state $S_c$, said apparatus comprising adding/deleting means:

for, only if said current state $S_c$ is less extended than the state $S_{EMAX}$, adding a number $n_{a1}$ of inactive units to a first one of said strings of inactive units previously having a number $I_{short1}$ of inactive units, $I_{short1}$ being less than a first threshold number $I_{th1}$ of inactive units and $1 \leq n_{a1} \leq (EMAX-c)$, $I_{th1}$ being smaller than said desired central number of inactive informational units, and correspondingly moving said current state $S_c$ to the state $S_{c+n_{a1}}$, and for, only if said current state $S_c$ is more extended than the state $S_{-CMAX}$, deleting a number $n_{d2}$ of inactive units from a second one of said strings of inactive units previously having a number $I_{long2}$ of inactive units, $I_{long2}$ being greater than a second threshold number $I_{th2}$ of inactive units and $1 \leq n_{d2} \leq (c+CMAX)$, $I_{th2}$ being larger than said desired central number of inactive informational units, and correspondingly moving said current state $S_c$ to the state $S_{c-n_d}$.

34. A network according to claim 33, said adding/deleting means being further for, only if said current state $S_c$ is more extended than the state $S_{-CMAX}$, deleting a number $n_{d1}$ of inactive units from a third one of said strings of inactive units previously having a number $I_{long1}$ of inactive units, $I_{long1}$ being greater than said first threshold number $I_{th1}$ of inactive units and $1 \leq n_{d1} \leq (c+CMAX)$, and correspondingly moving said current state $S_c$ to the state $S_{c-n_{d1}}$, and for, only if said current state $S_c$ is less extended than the state $S_{EMAX}$, adding a number $n_{a2}$ of inactive units to a fourth one of said strings of inactive units previously having a number $I_{short2}$ of inactive units, $I_{short2}$ being less than said second threshold number $I_{th2}$ of inactive units and $1 \leq n_{a2} \leq (EMAX-c)$, and correspondingly moving said current state $S_c$ to the state $S_{c+n_{a2}}$.

35. A network according to claim 33, wherein said network includes a plurality of stations, each of said stations having a data input port coupled to recieve data from said network and processing apparatus for processing data received by the data input port of said station, one of said adjusting components operating between the data input port and the processing apparatus of each of said stations, wherein said network further includes one of said smoothers operating between the adjusting component and the processing apparatus of each of said stations.

36. A network according to claim 34, wherein said network includes a plurality of stations, each of said stations having a data input coupled to receive data from said network and processing apparatus for processing data received by the data input port of said station, one of said adjusting components operating between the data input port and the processing apparatus of each of said stations, wherein said network further includes one of said smoothers operating between the adjusting component and the processing apparatus of each of said stations.

* * * * *